United States Patent
Kwon et al.

(10) Patent No.: US 12,096,461 B2
(45) Date of Patent: Sep. 17, 2024

(54) METHOD AND APPARATUS FOR THERMAL MANAGEMENT OF USER EQUIPMENT IN WIRELESS COMMUNICATION

(71) Applicant: SAMSUNG ELECTRONICS CO., LTD., Suwon-si (KR)

(72) Inventors: Yangsoo Kwon, Seoul (KR); Youngseok Jung, Suwon-si (KR); Inhyoung Kim, Yongin-si (KR); Inyup Kang, Nonan-si (KR); Mingoo Kim, Busan (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 377 days.

(21) Appl. No.: 17/223,099

(22) Filed: Apr. 6, 2021

(65) Prior Publication Data
US 2021/0314934 A1    Oct. 7, 2021

Related U.S. Application Data

(60) Provisional application No. 63/006,134, filed on Apr. 7, 2020.

(30) Foreign Application Priority Data

Sep. 8, 2020    (KR) .................. 10-2020-0114872

(51) Int. Cl.
*H04W 72/51*    (2023.01)
*H04L 1/1812*    (2023.01)
(Continued)

(52) U.S. Cl.
CPC ........... *H04W 72/51* (2023.01); *H04L 1/1812* (2013.01); *H04L 5/0048* (2013.01);
(Continued)

(58) Field of Classification Search
CPC ..... H04W 72/51; H04W 72/21; H04W 72/23; H04W 72/0446; H04L 1/1812; H04L 5/0048
(Continued)

(56) References Cited

U.S. PATENT DOCUMENTS

| 9,025,561 B2 | 5/2015 | Kawamura |
| 9,112,691 B2 | 8/2015 | Eshan et al. |

(Continued)

FOREIGN PATENT DOCUMENTS

| EP | 3661274 | 6/2020 |
| GB | 2339113 | 1/2000 |

(Continued)

OTHER PUBLICATIONS

LTE; Evolved Universal Terrestrial Radio Access (E-UTRA); Radio Resource Control (RRC); Protocol specification (3GPP TS 36.331 Release 15).

(Continued)

*Primary Examiner* — Chi Tang P Cheng
(74) *Attorney, Agent, or Firm* — F. Chau & Associates, LLC

(57) ABSTRACT

An apparatus includes a transceiver and at least one processor. The at least one processor is configured to identify overheating of the transceiver and/or the at least one processor, and wirelessly transmit a message including overheating assistance information based on the identified overheating to the base station via the transceiver. The overheating assistance information includes information about radio resources to be discontinuously processed by the apparatus in a time domain.

17 Claims, 24 Drawing Sheets

(51) Int. Cl.
*H04L 5/00* (2006.01)
*H04W 72/0446* (2023.01)
*H04W 72/21* (2023.01)
*H04W 72/23* (2023.01)

(52) U.S. Cl.
CPC ....... *H04W 72/0446* (2013.01); *H04W 72/21* (2023.01); *H04W 72/23* (2023.01)

(58) Field of Classification Search
USPC .......................................................... 702/132
See application file for complete search history.

(56) References Cited

U.S. PATENT DOCUMENTS

| | | | |
|---|---|---|---|
| 9,860,773 | B2 | 2/2018 | Roessel et al. |
| 9,955,492 | B2 | 4/2018 | Glik et al. |
| 9,999,037 | B2 | 6/2018 | Yang et al. |
| 2009/0059899 | A1* | 3/2009 | Bendelac ................ H04L 47/70 455/445 |
| 2010/0050034 | A1* | 2/2010 | Che ....................... H04L 1/1845 714/748 |
| 2010/0273517 | A1 | 10/2010 | Pinheiro et al. |
| 2018/0199185 | A1 | 7/2018 | Tenny et al. |
| 2019/0132824 | A1 | 5/2019 | Jeon et al. |
| 2019/0369682 | A1 | 12/2019 | Prabhakar et al. |
| 2020/0053699 | A1 | 2/2020 | Chen et al. |
| 2020/0053763 | A1* | 2/2020 | Ljung ................... H04W 24/04 |
| 2020/0077305 | A1 | 3/2020 | Hong |
| 2020/0100099 | A1 | 3/2020 | Tenny et al. |
| 2020/0106674 | A1 | 4/2020 | Van Der Velde |
| 2020/0174543 | A1 | 6/2020 | Hong |
| 2021/0385804 | A1* | 12/2021 | Ye ......................... H04W 72/20 |

FOREIGN PATENT DOCUMENTS

| | | |
|---|---|---|
| KR | 10-2019-0102278 | 9/2019 |
| WO | 2019028711 | 2/2019 |

OTHER PUBLICATIONS

5G; NR; Radio Resource Control (RRC); Protocol specification (3GPP TS 38.331, Release 15).
5G; NR; Multiplexing and channel coding (3GPP TS 38.212 Release 15).
3GPP TS 38.213 V16.1.0 (Mar. 2020) Physical layer procedures for control (Release 16) 3rd Generation Partnership Project; Technical Specification Group Radio Access Network; NR.
Extended European Search Report dated Sep. 6, 2021 in corresponding EP Patent Application No. 21167016.1.

* cited by examiner

METHOD AND APPARATUS FOR THERMAL MANAGEMENT OF USER EQUIPMENT IN WIRELESS COMMUNICATION

CROSS-REFERENCE TO RELATED APPLICATIONS

This application claims priority under 35 U.S.C. § 119 to U.S. Provisional Patent Application No. 63/006,134, filed on Apr. 7, 2020 in the U.S. Patent and Trademark Office, and Korean Patent Application No. 10-2020-0114872, filed on Sep. 8, 2020 in the Korean Intellectual Property Office, the disclosures of which are incorporated by reference herein in their entireties.

TECHNICAL FIELD

Embodiments of the inventive concept relate to wireless communication, and more particularly, to a method and apparatus for thermal management of a user equipment in wireless communication.

DISCUSSION OF RELATED ART

Radio access technology (RAT) employs various techniques to achieve a high data rate. For example, RAT may employ millimeter wave (mmWave) bands, analog beamforming, massive multi-input and multi-output (MIMO), full dimensional (FD)-MIMO, Advanced Coding and Modulation, etc.

SUMMARY

Embodiments of the inventive concept provide a method and apparatus for reducing, removing or preventing overheating through thermal management of a user equipment.

According to an embodiment of the inventive concept, there is provided an apparatus for wireless communication with a base station. The apparatus includes a transceiver and at least one processor. The at least one processor is configured to identify overheating of the transceiver and/or the at least one processor and wirelessly transmit, to the base station via the transceiver, a message including overheating assistance information based on the identified overheating. The overheating assistance information includes information about radio resources to be discontinuously processed by the apparatus in a time domain.

According to an embodiment of the inventive concept, there is provided an apparatus for wireless communication with a user equipment. The apparatus includes a transceiver and at least one processor. The at least one processor is configured to wirelessly receive, from the user equipment via the transceiver, a message including overheating assistance information generated based on overheating of the user equipment and transmit radio resources scheduled based on the overheating assistance information, to the user equipment via the transceiver. The overheating assistance information includes information about radio resources to be discontinuously processed by the user equipment in a time domain.

According to an embodiment of the inventive concept, there is provided an apparatus for wireless communication with a base station. The apparatus includes a transceiver and at least one processor. The at least one processor is configured to identify overheating of the transceiver and/or the at least one processor and wirelessly transmit, to the base station via the transceiver, a message including overheating assistance information based on the identified overheating. The overheating assistance information includes information about transport blocks to be processed by the at least one processor per unit time.

According to an embodiment of the inventive concept, there is provided an apparatus for wireless communication with a base station. The apparatus includes a transceiver and at least one processor. The at least one processor is configured to identify overheating of the transceiver and/or the at least one processor, wirelessly transmit, to the base station via the transceiver, a message including overheating assistance information based on the identified overheating, and selectively process a transport block wirelessly received from the base station, based on the overheating assistance information.

BRIEF DESCRIPTION OF THE DRAWINGS

The above and other features of the inventive concept will become more apparent by describing in detail embodiments thereof with reference to the accompanying drawings in which.

DETAILED DESCRIPTION

Figure 1:
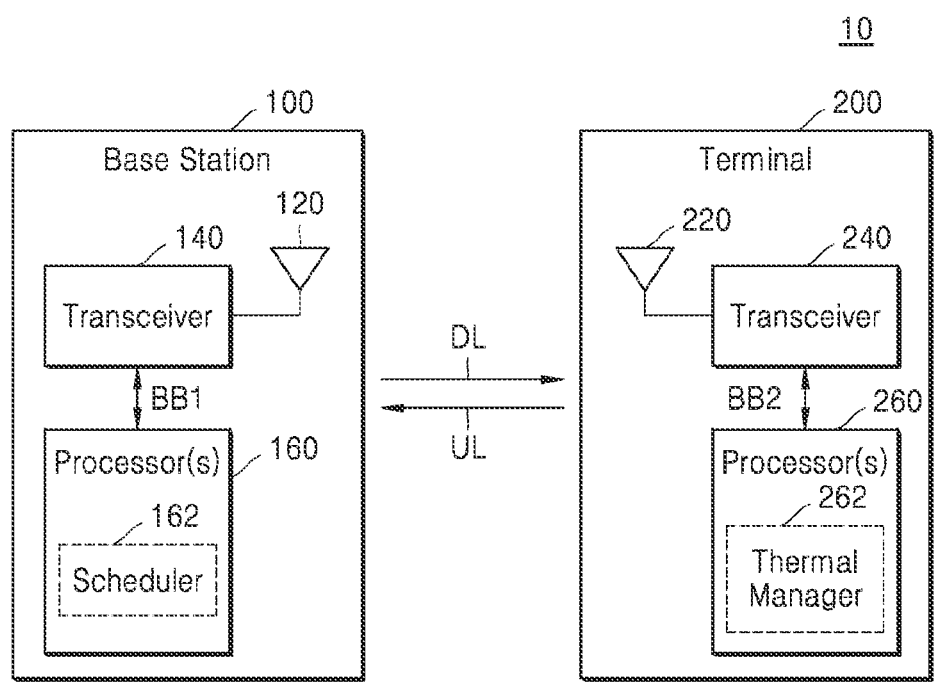
FIG. 1 is a block diagram illustrating a wireless communication system according to an embodiment.

Embodiments of the present inventive concept will be described more fully hereinafter with reference to the accompanying drawings. Like reference numerals may refer to like elements throughout the accompanying drawings.

The terms "first," "second," "third," etc. are used herein to distinguish one element from another, and the elements are not limited by these terms. Thus, a "first" element in an embodiment may be described as a "second" element in another embodiment.

As used herein, the singular forms "a", "an" and "the" are intended to include the plural forms as well, unless the context clearly indicates otherwise.

As used herein, the term "and/or" includes any and all combinations of one or more of the associated listed items.

It should be understood that descriptions of features or aspects within each embodiment should typically be considered as available for other similar features or aspects in other embodiments, unless the context clearly indicates otherwise.

FIG. 1 is a block diagram illustrating a wireless communication system 10 according to an embodiment. The wireless communication system 10 may also be referred to as Radio Access Technology (RAT). Examples of the wireless communication system 10 include, but are not limited to, a wireless communication system based on multiple access such as Code Division Multiple Access (CMDA), Frequency Division Multiple Access (FDMA), Time Division Multiple Access (TDMA), Orthogonal Frequency Division Multiple Access (OFDMA), or Single Carrier Frequency Division Multiple Access (SC-FDMA). For example, the 3rd Generation Partnership Project (3GPP) Long Term Evolution (LTE) may employ OFDMA in a downlink (DL) and SC-FDMA in an uplink (UL), and Advanced LTE (LTE-A) may correspond to the advanced version of 3GPP-LTE. Also, following LTE-A, 5th generation wireless (5G) New Radio (NR) has been proposed to enable high performance and low latency, and here, every available spectrum resource such as low-frequency bands of about 1 GHz or less, intermediate frequency bands of about 1 GHz to about 10 GHz, and high frequency bands of about 24 GHz or higher (millimeter wave), may be utilized. Hereinafter, the wireless communication system 10 will be assumed to be 5G NR, but it will be understood that embodiments are not limited thereto.

A base station 100 may be a fixed station that communicates with a terminal 200 and/or other base stations, and may exchange data and control information by communicating with the terminal 200 and/or other base stations. For example, the base station 100 may be referred to as Node B, evolved-Node B (eNB), Next generation Node B (gNB), a Sector, a Site, a Base Transceiver System (BTS), an Access Point (AP), a Relay Node, a Remote Radio Head (RRH), a Radio Unit (RU), or a small cell. Herein, the base station 100 or a cell may be interpreted to have a comprehensive meaning indicating a partial area or function covered by a base station controller (BSC) in CMDA, Node-B in WCDMA, eNB in LTE, gNB in 5G NR, or a sector (site) or the like, and may include any various coverage areas such as, for example, a megacell, a macrocell, a microcell, a picocell, a femtocell, relay nodes, RRH, RU, small cell communication ranges, or the like.

As illustrated in FIG. 1, the base station 100 may include an antenna 120, a transceiver 140, and at least one processor 160. The antenna 120 may receive a radio frequency (RF) signal from the terminal 200 or output an RF signal transmitted to the terminal 200. In embodiments, the antenna 120 may include an antenna array including multiple antennas for multi-input and multi-output (MIMO), beamforming, or the like. The transceiver 140 may provide, to the at least one processor 160, a baseband signal BB1 by processing an RF signal received via the antenna 120 in a reception mode, and output an RF signal via the antenna 120 by processing the baseband signal BB1 provided by the at least one processor 160 in a transmission mode. In embodiments, the transceiver 140 may include various circuits such as, for example, a filter, a mixer, a power amplifier, a low-noise amplifier, a switch, or the like. The transceiver 140 may also be referred to herein as a radio frequency integrated circuit (RFIC).

The at least one processor 160 may receive the baseband signal BB1 from the transceiver 140 in a reception mode, and provide the baseband signal BB1 to the transceiver 140 in a transmission mode. The at least one processor 160 may process the baseband signal BB1 in the reception mode to thereby extract information included in the baseband signal BB1 including, for example, data and/or control information. Also, the at least one processor 160 may generate the baseband signal BB1 from data and/or control information to be transmitted to the terminal 200, in the transmission mode. In embodiments, the at least one processor 160 may include a core configured to execute instructions, and execute a program including a series of instructions. In addition, in embodiments, the at least one processor 160 may include an intellectual property (IP) core and/or field programmable gate array (FPGA) designed by logic synthesis. However, the at least one processor 160 is not limited thereto.

As illustrated in FIG. 1, the at least one processor 160 may implement a scheduler 162. The scheduler 162 may control assignment of time-frequency resources, that is, radio resources, thereby allocating radio resources to communication with the terminal 200. For example, the scheduler 162 may allocate radio resources for a downlink (DL) based on a channel status provided by the terminal 200, and may allocate radio resources for an uplink (UL) based on a buffer status provided by the terminal 200. In embodiments, the scheduler 162 may be included in a medium access control (MAC) layer. As will be described later with reference to the drawings, the scheduler 162 may allocate radio resources for a DL and/or an UL based on a message that is provided by the terminal 200 and includes overheating assistance information. Accordingly, the scheduler 162 may efficiently schedule radio resources to prevent or reduce overheating of the terminal 200, and may utilize radio resources, which are not used for the terminal 200, in communication with other user equipment (UE).

The terminal 200 may be fixed or mobile, and may refer to any devices capable of transmitting or receiving data and/or control information by communicating with the base station 100. For example, the terminal 200 may be referred to as a user equipment (UE), a terminal equipment, a mobile station (MS), a mobile terminal (MT), a user terminal (UT), a subscriber station (SS), a wireless device, a handheld device, or the like. As illustrated in FIG. 1, the terminal 200 may communicate with the base station 100 through an UL or a DL. Also, the terminal 200 may communicate with another user equipment through a sidelink (SL). Hereinafter, it is assumed that the base station 100 is a gNB and the terminal 200 is a UE. However, embodiments are not limited thereto.

As illustrated in FIG. 1, the terminal 200 may include an antenna 220, a transceiver 240, and at least one processor 260. The antenna 220 may receive an RF signal from the base station 100 or output an RF signal transmitted to the base station 100. The antenna 220 may include an antenna array including a plurality of antennas for MIMO, beamforming, or the like. The transceiver 240 may provide, to the at least one processor 260, a baseband signal BB2 by processing an RF signal received via the antenna 220 in a reception mode, and output an RF signal via the antenna 220 by processing the baseband signal BB2 provided by the at least one processor 260 in a transmission mode. In embodiments, the transceiver 240 may include various circuits such as, for example, a filter, a mixer, a power amplifier, a low-noise amplifier, a switch, or the like. The transceiver 240 may also be referred to as an RFIC.

The at least one processor 260 may receive the baseband signal BB2 from the transceiver 240 in a reception mode, and provide the baseband signal BB2 to the transceiver 240 in a transmission mode. The at least one processor 260 may process the baseband signal BB2 in the reception mode to thereby extract information included in the baseband signal BB2 including, for example, data and/or control information. Also, the at least one processor 260 may generate the baseband signal BB2 from data and/or control information to be transmitted to the base station 100, in the transmission mode. In embodiments, the at least one processor 260 may include a core configured to execute instructions, and execute a program including a series of instructions. Also, in embodiments, the at least one processor 260 may include an IP core and/or an FPGA designed by logic synthesis. The at least one processor 260 may be referred to as a communication processor, a baseband processor, a modem, or the like.

As illustrated in FIG. 1, the at least one processor 260 may implement a thermal manager 262. The thermal manager 262 may identify overheating of the terminal 200, for example, overheating of the transceiver 240 and/or the at least one processor 260. In embodiments, the thermal manager 262 may transmit a message including overheating assistance information to the base station 100 based on the identified overheating, thereby inducing the base station 100 (e.g., the scheduler 162) to change scheduling of radio resources for a DL and/or an UL. Also, in embodiments, the thermal manager 262 may reduce a throughput of the transceiver 240 and/or the at least one processor 260 based on the identified overheating. Accordingly, the thermal manager 262 may efficiently prevent or reduce overheating in the terminal 200, errors of and/or damage to the terminal 200 may be prevented or reduced, and users may be protected from overheating of the terminal 200.

Figure 2:
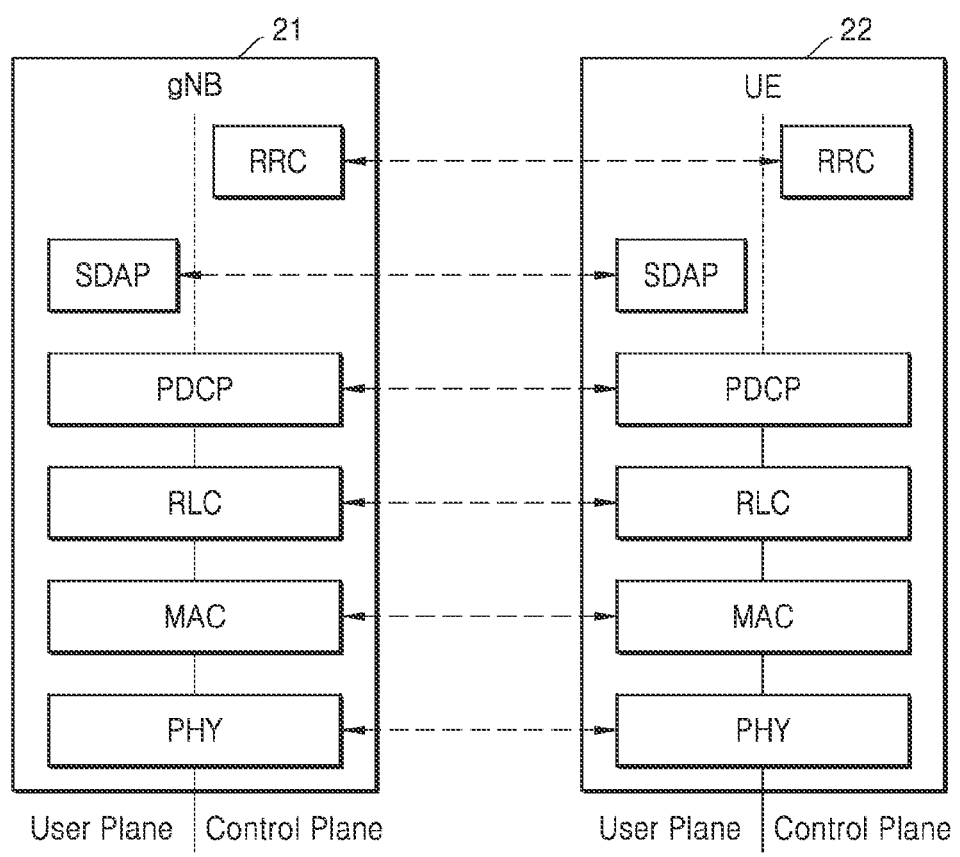
FIG. 2 is a block diagram illustrating an example of a protocol stack according to an embodiment.

FIG. 2 is a block diagram illustrating an example of a protocol stack according to an embodiment. For example, the block diagram of FIG. 2 illustrates a portion of a radio protocol architecture regarding a user plane and a control plane in wireless communication between a gNB 21 and a UE 22.

The gNB 21 and the UE 22 may communicate with each other based on lower three layers of the open system interconnection (OSI) standard model, that is, first through third layers L1 through L3. For example, as illustrated in FIG. 2, the gNB 21 and the UE 22 may communicate with each other based on a physical (PHY) layer included in the first layer L1, a MAC layer, a radio link control (RLC) layer, a packet data convergence control (PDCP) layer, and a service data adaptation protocol (SDAP) layer included in the second layer L2, and a radio resource control (RRC) layer included in the third layer L3. As illustrated in FIG. 2, the SDAP layer may be included in the user plane, and the RRC layer may be included in the control plane.

The RRC layer may control access between the gNB 21 and the UE 22, and the gNB 21 and the UE 22 may be in one of three RRC statuses, that is, RRC_IDLE, RRC_INACTIVE, and RRC_CONNECTED. The SDAP layer is a layer added in 5G NR and may map quality-of-service (QOS) bearers to radio bearers based on QoS requirements. The PDCP layer may perform transmission, header compression, and ciphering of user data. The RLC layer may perform concatenation, segmentation, and recombination of an RLC service data unit (SDU), and may support various modes to ensure a QoS demanded by radio bearers. The MAC layer may perform mapping between a logic channel and a transmission channel, hybrid repeat request (HARQ) retransmissions, and multiplexing and demultiplexing between a MAC SDU and transport blocks. The PHY layer may transmit or receive information to and from a counterpart via a physical channel such as, for example, a physical downlink control channel (PDCCH), a physical downlink shared channel (PDSCH), a physical control format indicator channel (PCFICH), a physical hybrid ARQ indicator channel (PHICH), a physical uplink control channel (PUCCH), a physical uplink shared channel (PUSCH), or the like.

As illustrated in FIG. 2, the gNB 21 and the UE 22 may each include components for respectively performing the RRC layer, the SDAP layer, the PDCP layer, the RLC layer, the MAC layer, and the PHY layer, and the at least one processor 160 included in the base station 100 of FIG. 1 and the at least one processor 260 included in the terminal 200 of FIG. 1 may implement the above-described components. In embodiments, the scheduler 162 of FIG. 1 may be included in a MAC component of the gNB 21, and the thermal manager 262 of FIG. 1 may be included in a MAC component and/or a PHY component of the UE 22. Hereinafter, an operation performed by a scheduler of the gNB 21 may be described as an operation performed by the gNB 21, and an operation performed by the thermal manager 262 of the UE 22 may be described as an operation performed by the UE 22.

Figure 3:
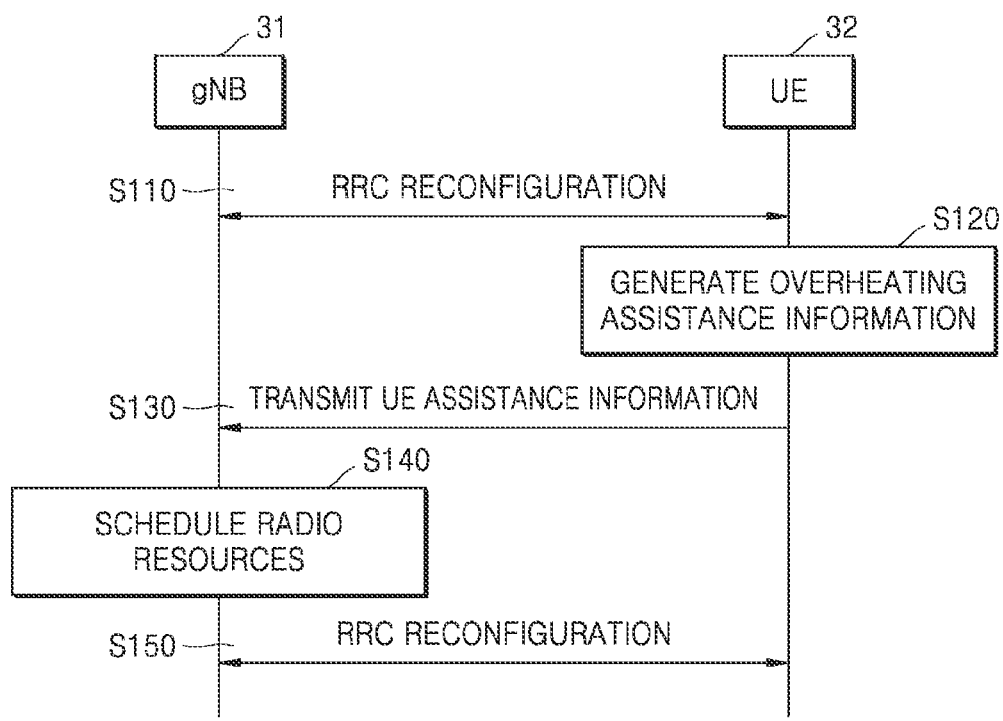
FIG. 3 is a flowchart of a method of thermal management of a user equipment (UE), according to an embodiment.

FIG. 3 is a flowchart of a method of thermal management of a UE 32, according to an embodiment. As illustrated in FIG. 3, the method of thermal management of the UE 32 may include a plurality of operations S110, S120, S130, S140 and S150.

In operation S110, RRC reconfiguration (or RRC connection reconfiguration) may be performed. For example, a gNB 31 may determine RRC parameters, and may provide, to the UE 32, a message for RRC reconfiguration based on the determined RRC parameters. In embodiments, the UE 32 may provide, to the gNB 31, a message indicating completion of the RRC reconfiguration, in response to the message for RRC reconfiguration received from the gNB 31.

In operation S120, the UE 32 may generate overheating assistance information, and in operation S130, the UE 32 may transmit UE assistance information including overheating assistance information to the gNB 31. According to "LTE; Evolved Universal Terrestrial Radio Access (E-UTRA); Radio Resource Control (RRC); Protocol specification (3GPP TS 36.331 Release 15)", the disclosure of which is incorporated by reference herein in its entirety and is referred to hereinafter as "Document 1", and "5G; NR; Radio Resource Control (RRC); Protocol specification (3GPP TS 38.331, Release 15)", the disclosure of which is incorporated by reference herein in its entirety and is referred to hereinafter as "Document 2", after the RRC configuration is completed by the gNB 31, the UE 32 may transmit UE assistance information to the gNB 31 to request a change in RRC configuration. The UE 32 may generate various types of overheating assistance information to avoid overheating of the UE 32, and transmit UE assistance information including the overheating assistance information to the gNB 31. For example, the UE 32 may generate overheating assistance information including information about radio resources to be discontinuously processed in a time domain and/or information about an amount of transport blocks to be processed per unit time, or the like. In embodiments, discontinuously processing radio resources in a time domain may mean stopping processing, or refraining from processing, radio resources during the time domain. In embodiments, discontinuously processing radio resources in a time domain may mean decreasing the frequency at which radio resources are processed in the time domain. Examples of the overheating assistance information generated by the UE 32 will be described later by referring to the drawings.

In operation S140, the gNB 31 may schedule radio resources, and in operation S150, RRC reconfiguration may be performed. For example, the gNB 31 may change radio resources allocated to the UE 32 based on the UE assistance information received in operation S130. In embodiments, when the UE assistance information requests a limited operation to avoid overheating of the UE 32, the gNB 31 may reduce radio resources allocated to the UE 32 and/or transport blocks to be transmitted to the UE 32, and may use radio resources obtained thereby in communication with other UEs. The gNB 31 may determine RRC parameters through scheduling of radio resources, transmit a message for RRC reconfiguration to the UE 32 based on the determined RRC parameters, and then receive, from the UE 32, a message indicating completion of the RRC reconfiguration.

Figure 4A:
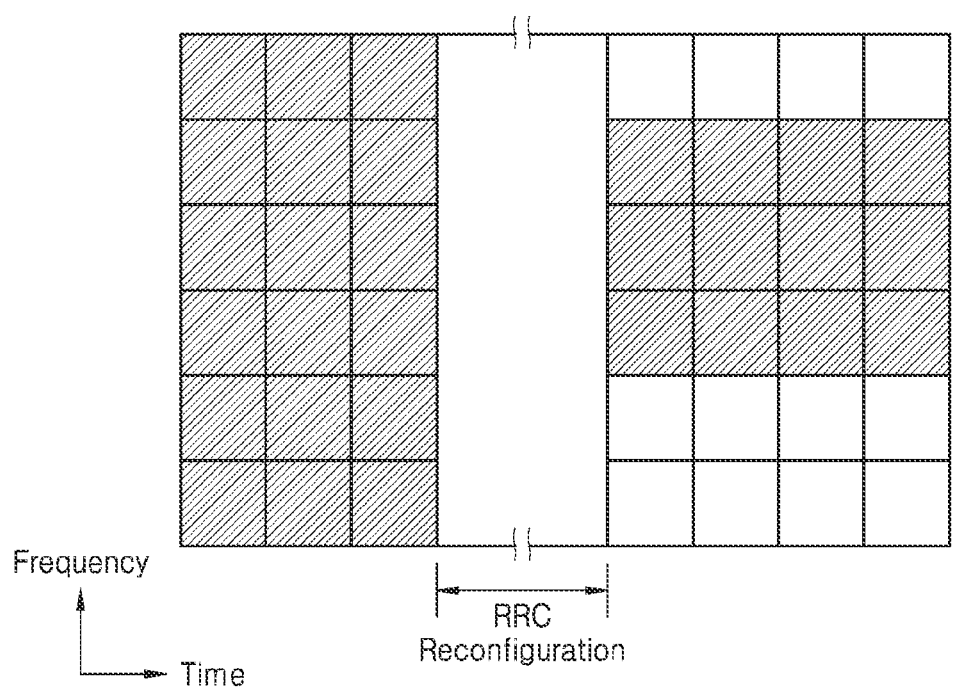
FIGS. 4A and 4B are diagrams illustrating examples of radio resources scheduled to avoid overheating of a UE, according to embodiments.
Figure 4B:
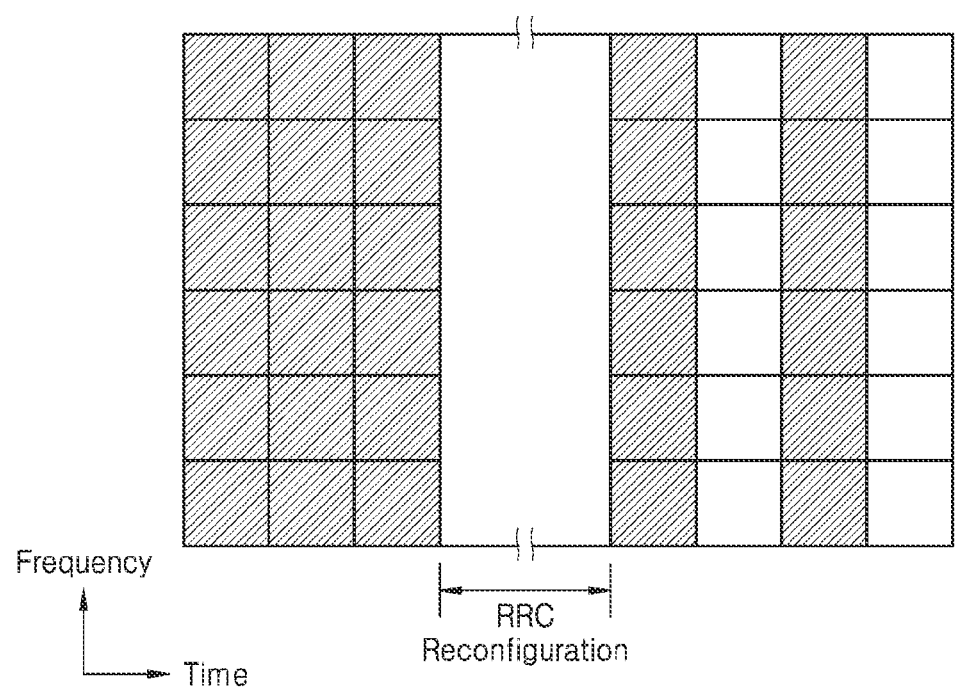

FIGS. 4A and 4B are diagrams illustrating examples of radio resources scheduled to avoid overheating of a user equipment, according to embodiments. In embodiments, the gNB 31 of FIG. 3 may schedule radio resources indicated by hatching in FIGS. 4A and 4B through RRC reconfiguration based on the overheating assistance information provided by the UE 32. Hereinafter, FIGS. 4A and 4B will be described with reference to FIG. 3.

Referring to FIG. 4A, radio resources may be scheduled by reducing a frequency range to which radio resources are allocated. According to Document 1, UE assistance information in LTE may include various information indicating a status of the UE 32, and the UE assistance information may include overheating assistance information as shown in Table 1 and Table 2 below.

TABLE 1

OtherParameters-v1450 ::= SEQUENCE {
    overheatingInd-r14 ENUMERATED {supported} OPTIONAL
}

TABLE 2

OverheatingAssistance-r14 ::= SEQUENCE {
    reducedUE-Category SEQUENCE {
        reducedUE-CategoryDL INTEGER (0..19),
        reducedUE-CategoryUL INTEGER (0..21)
    } OPTIONAL,
    reducedMaxCCs SEQUENCE {
        reducedCCsDL INTEGER (0..31),
        reducedCCSUL INTEGER (0..31)
    } OPTIONAL
}

In Table 1, overheatingInd may indicate whether the UE 32 is able to support overheating assistance information. In Table 2, reducedUE-CategoryDL and reducedUE-CategoryUL may respectively indicate categories of the UE 32 in a DL and an UL, and reducedCCsDL and reducedCCsUL may respectively indicate maximum numbers of component carriers of the DL and the UL. According to Document 2, UE assistance information in 5G NR may include various information indicating a status of the UE 32, and the UE assistance information may include overheating assistance information as shown in Table 3 and Table 4 below.

TABLE 3

UE-NR-Capability-v1540 ::= SEQUENCE {
    sdap-Parameters SDAP-Parameters OPTIONAL,
    overheatingInd ENUMERATED {supported} OPTIONAL,
    ims-Parameters IMS-Parameters OPTIONAL,
    fr1-Add-UE-NR-Capabilities-v1540 UE-NR-CapabilityAddFRX-Mode-v1540 OPTIONAL,
    fr2-Add-UE-NR-Capabilities-v1540 UE-NR-Capability AddFRX-Mode-v1540 OPTIONAL,
    fr1-fr2-Add-UE-NR-Capabilities UE-NR-CapabilityAddFRX-Mode OPTIONAL,
    nonCriticalExtension UE-NR-Capability-v1550 OPTIONAL
}

TABLE 4

OverheatingAssistance ::= SEQUENCE {
    reducedMaxCCs SEQUENCE {
        reducedCCsDL INTEGER (0..31),
        reducedCCsUL INTEGER (0..31)
    } OPTIONAL,
    reducedMaxBW-FR1 SEQUENCE {
        reducedBW-FR1-DL ReducedAggregatedBandwidth,
        reducedBW-FR1-UL ReducedAggregatedBandwidth
    } OPTIONAL,
    reducedMaxBW-FR2 SEQUENCE {
        reducedBW-FR2-DL ReducedAggregatedBandwidth,
        reducedBW-FR2-UL ReducedAggregatedBandwidth
    } OPTIONAL, TABLE 4-continued

```
reducedMaxMIMO-LayersFR1 SEQUENCE {
    reducedMIMO-LayersFR1-DL MIMO-LayersDL,
    reducedMIMO-LayersFR1-UL MIMO-LayersUL
  } OPTIONAL,
  reducedMaxMIMO-LayersFR2 SEQUENCE {
    reducedMIMO-LayersFR2-DL MIMO-LayersDL,
    reducedMIMO-LayersFR2-UL MIMO-LayersUL
  } OPTIONAL
}
ReducedAggregatedBandwidth ::= ENUMERATED {mhz0, mhz10, mhz20, mhz30,
mhz40, mhz50, mhz60, mhz80, mhz100, mhz200, mhz300, mhz400}
```

In Table 3, overheatingInd may indicate whether the UE 32 is able to support overheating assistance information. Also, in Table 4, reducedMaxCCsDL and reducedMaxCCsUL may respectively indicate maximum numbers of component carriers of a DL and an UL. Also, in Table 4, reducedBW-FR1-DL and reducedBW-FR1-UL may respectively indicate aggregated bandwidths of a DL and an UL in frequency range 1 (FR1), and reducedBW-FR2-DL and reducedBW-FR2-UL may respectively indicate aggregated bandwidths of the DL and the UL in frequency range 2 (FR2). Also, in Table 4, reducedMIMO-LayersFR1-DL and reducedMIMO-LayersFR1-UL may respectively indicate maximum numbers of MIMO layers of the DL and the UL in FR1, and reducedMIMO-LayersFR2-DL and reducedMIMO-LAyersFR2-UL may respectively indicate maximum numbers of MIMO layers of the DL and the UL in FR2.

Referring to FIG. 4B, radio resources may be scheduled such that the radio resources are discontinuously processed in a time domain. For example, the gNB 31 may discontinuously allocate radio resources for the UE 32 in a time domain, based on overheating assistance information provided by the UE 32. In embodiments, discontinuously allocating radio resources in a time domain may mean stopping allocating, or refraining from allocating, radio resources during the time domain. In embodiments, discontinuously allocating radio resources in a time domain may mean decreasing the frequency at which radio resources are allocated in the time domain. In the example illustrated in FIG. 4A, a throughput may be reduced in the UE 32 due to channel bandwidth reduced after the RRC reconfiguration, whereas components included in the UE 32, for example, the transceiver 240 and the at least one processor 260 of FIG. 1, may operate continuously to process the radio resources. On the other hand, in the example illustrated in FIG. 4B, the throughput may be reduced in the UE 32 due to the radio resources that are discontinuously allocated after the RRC reconfiguration, and also, in a period when the radio resources are not processed, components of the UE 32, for example, the transceiver 240 and/or the at least one processor 260 of FIG. 1, may have an idle state and/or a low-power state. Accordingly, heat generated by the transceiver 240 and/or the at least one processor 260 may be efficiently reduced, and overheating in the UE 32 may be quickly reduced or prevented. In addition, the gNB 31 may allocate radio resources of a period in which radio resources not allocated to the UE 32, to another UE, and thus, the gNB 31 may efficiently schedule radio resources for multiple UEs included in a cell. For example, the gNB 31 may utilize the entire bandwidth for a certain UE in a given period, and may thus efficiently perform beamforming, such as hybrid beamforming applied in FR2.

Figure 5:
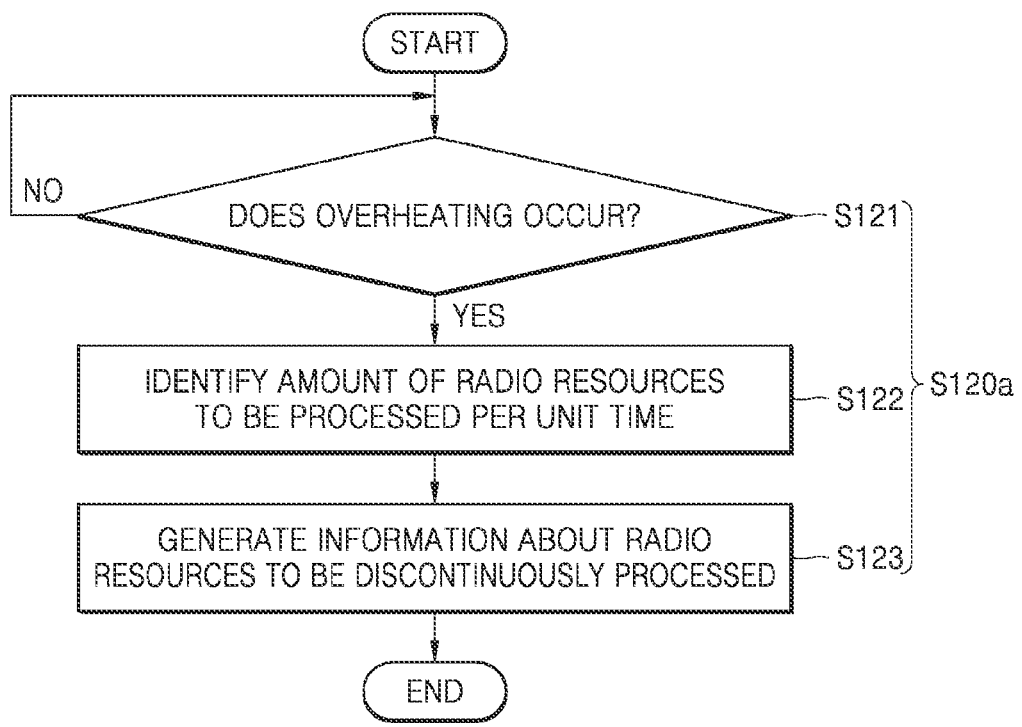
FIG. 5 is a flowchart of a method of thermal management of a UE, according to an embodiment.

FIG. 5 is a flowchart of a method of thermal management of a UE, according to an embodiment. For example, the flowchart of FIG. 5 illustrates an example of operation S120 of FIG. 3. As described above with reference to FIG. 3, overheating assistance information may be generated in operation S120 of FIG. 3, and thus, operation S120a of FIG. 5. As illustrated in FIG. 5, operation S120a may include a plurality of operations S121, S121 and S123. FIG. 5 will be described with reference to FIG. 3.

In operation S121, whether overheating occurs may be determined. For example, the UE 32 of FIG. 3 may include at least one temperature sensor, and the at least one temperature sensor may detect the temperature of components included in the UE 32 including, for example, the transceiver 240 (see FIG. 1) and/or the at least one processor 260 (see FIG. 1). In embodiments, the transceiver 240 (see FIG. 1) and/or the at least one processor 260 (see FIG. 1) may include at least one temperature sensor. The UE 32 (or the at least one processor 260) may determine whether overheating has occurred, based on the temperature detected using the at least one temperature sensor, and as illustrated in FIG. 5, when overheating has occurred, operation S122 may be subsequently performed.

In operation S122, an amount of radio resources to be processed per unit time may be identified. For example, the UE 32 may identify the amount of radio resources to be processed per unit time, based on a level of overheating determined in operation S121, that is, based on a temperature. When the level of overheating is relatively low, the UE 32 may identify the amount of radio resources less reduced from an amount of radio resources currently processed per unit time, and when the level of overheating is relatively serious (e.g., when the detected temperature is close to a threshold temperature), the UE 32 may identify the amount of radio resources more reduced from the amount of radio resources currently processed per unit time. A unit time may be defined as an arbitrary period having a certain length in a time domain, and in embodiments, a unit time may include, for example, a subframe, a slot, or the like.

In operation S123, information about radio resources to be discontinuously processed may be generated. For example, the UE 32 may generate, as overheating assistance information, information about radio resources to be discontinuously processed to meet the amount of the radio resources identified in operation S122. An example of operation S123 will be described below with reference to FIG. 6.

Figure 6:
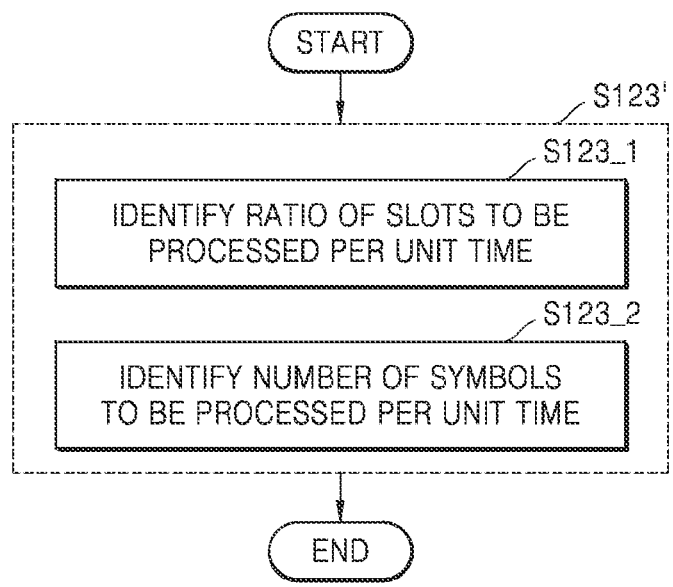
FIG. 6 is a flowchart of a method of thermal management of a UE, according to an embodiment.

FIG. 6 is a flowchart of a method of thermal management of a UE, according to an embodiment. For example, the flowchart of FIG. 6 illustrates an example of operation S123 of FIG. 5. As described above with reference to FIG. 5, in operation S123' of FIG. 6, information about radio resources to be discontinuously processed may be generated. Operation S123' may include operation S123_1 and operation S123_2 as illustrated in FIG. 6. However, embodiments are not limited thereto. For example, in embodiments, unlike FIG. 6, operation S123' may include only one of operation S123_1 and operation S123_2. Hereinafter, FIG. 6 will be described with reference to FIGS. 3 and 5.

In operation S123_1, a ratio of slots to be processed per unit time may be identified. For example, as described above with reference to FIG. 4B, for discontinuous allocation of radio resources in a time domain, the UE 32 may identify a ratio of slots to be processed (or slots that are processible)

per unit time, and include the identified ratio of slots in overheating assistance information. In embodiments, the UE 32 may calculate a ratio of slots based on a predefined function from detected temperature or may obtain a ratio of slots based on a predefined lookup table. In embodiments, the UE 32 may generate overheating assistance information as shown in Table 5.

TABLE 5

```
OverheatingAssistance ::= SEQUENCE {
    ...
    reducedSlotRatio-FR1 SEQUENCE {
        reducedSlotRatio-FR1-DL ReducedSlotAllocatedRatio,
        reducedSlotRatio-FR1-UL ReducedSlotAllocatedRatio
    } OPTIONAL,
    reducedSlotRatio-FR2 SEQUENCE {
        reducedSlotRatio-FR2-DL ReducedSlotAllocatedRatio,
        reducedSlotRatio-FR2-UL ReducedSlotAllocatedRatio
    } OPTIONAL,
}
ReducedSlotAllocatedRatio ::= ENUMERATED {s10, s20, s30, s40, s50, s60, s70, s80, s90, s100}
```

In Table 5, reducedSlotRatio-FR1-DL and reducedSlotRatio-FR1-UL may respectively indicate ratios of slots intended to be allocated to the UE 32, with respect to all the allocable slots of a DL and an UL in FR1. Similarly, reducedSlotRatio-FR2-DL and reducedSlotRatio-FR2-UL may respectively indicate ratios of slots intended to be allocated to the UE 32, with respect to all the allocable slots of a DL and an UL in FR2. In embodiments, like ReducedSlotAllocatedRatio defined in Table 5, each of reducedSlotRatio-FR1-DL, reducedSlotRatio-FR1-UL, reducedSlotRatio-FR2-DL, and reducedSlotRatio-FR2-UL may have a value corresponding to n*10% ($1 \leq n \leq 10$, n is an integer). In addition, in embodiments, in Table 5, as marked by " . . . ", reducedSlotRatio-FR1 and/or reducedSlotRatio-FR2 may be additionally included in OverheatingAssistance of Table 4. The names and formats presented in Table 5 are examples, and embodiments are not limited to the names or formats shown in Table 5.

In operation S123_2, an amount of symbols to be processed per unit time may be identified. For example, as described above with reference to FIG. 4B, for discontinuous allocation of radio resources in a time domain, the UE 32 may identify the number of symbols to be processed per unit time, and include the identified number of symbols in overheating assistance information. In embodiments, the UE 32 may calculate the number of symbols from a detected temperature based on a predefined function or may obtain the number of symbols based on a predefined lookup table. In embodiments, the UE 32 may generate overheating assistance information as shown in Table 6.

In Table 6, reducedSymbol-FR1-DL and reducedSymbol-FR1-UL may respectively indicate the numbers of symbols intended to be allocated to a DL and an UL in FR1. Similarly, reducedSymbol-FR2-DL and reducedSymbol-FR2-UL may respectively indicate the numbers of symbols intended to be allocated to the DL and the UL in FR2. In embodiments, the UE 32 may generate the number of symbols intended to be allocated to a slot, and thus, as presented in Table 6, reducedSymbol-FR1-DL, reducedSymbol-FR1-UL, reducedSymbol-FR2-DL, and reducedSymbol-FR2-UL may each have a value corresponding to an integer greater than or equal to 2 and less than or equal to 14. In addition, in embodiments, in Table 6, as marked by " . . . ", reducedSymbolAlloc-FR1 and/or reducedSymbolAlloc-FR2 may be additionally included in OverheatingAssistance of Table 4. The names and formats presented in Table 6 are examples, and embodiments are not limited to the names or formats shown in Table 6.

Figure 7:
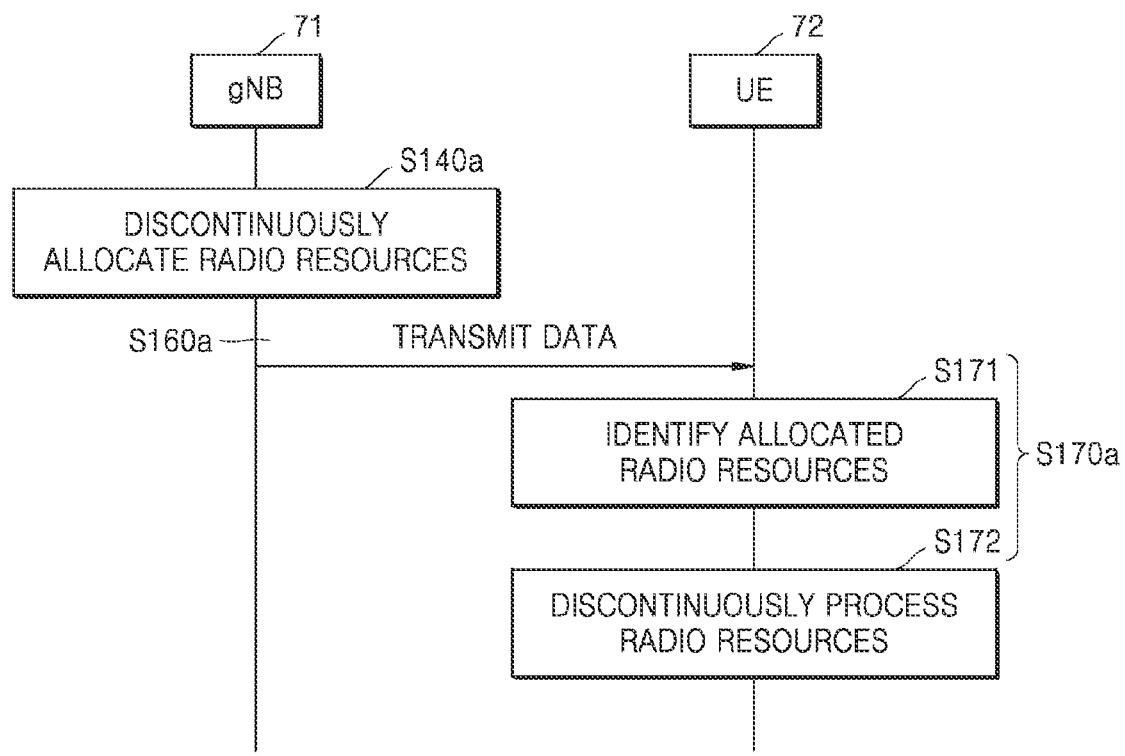
FIG. 7 is a flowchart of a method of thermal management of a UE, according to an embodiment.

FIG. 7 is a flowchart of a method of thermal management of a UE, according to an embodiment. For example, the flowchart of FIG. 7 illustrates an example of operations in which radio resources are discontinuously allocated and processed based on overheating assistance information generated in operation S120a of FIG. 5. As illustrated in FIG. 7, a method of thermal management of a UE may include a plurality of operations S140a, S160a and S170a, and operation S170a may include operation S171 and operation S172. Hereinafter, in the description of FIG. 7, it will be assumed that a UE 72 generates overheating assistance information in operation S120a of FIG. 5 and provides the same to a gNB 71, and FIG. 7 will be described with reference to FIGS. 5 and 6.

In operation S140a, the gNB 71 may discontinuously allocate radio resources. In embodiments, the gNB 71 may receive the overheating assistance information presented in Table 5 from the UE 72, and may discontinuously allocate slots for the UE 72 in a time domain based on the received

TABLE 6

```
OverheatingAssistance ::= SEQUENCE {
    ...
    reducedSymbolAlloc-FR1 SEQUENCE {
        reducedSymbol-FR1-DL ReducedSymbolAllocated,
        reducedSymbol-FR1-UL ReducedSymbolAllocated
    } OPTIONAL,
    reducedSymbolAlloc-FR2 SEQUENCE {
        reducedSymbol-FR2-DL ReducedSymbolAllocated,
        reducedSymbol-FR2-UL ReducedSymbolAllocated
    } OPTIONAL,
}
ReducedSymbolAllocated ::= ENUMERATED {s2, s3, s4, s5, s6, s7, s8, s9, s10, s11, s12, s13, s14}
``` overheating assistance information. For example, the gNB 71 may determine indices of slots for the UE 72 within a range of a ratio of slots requested by the UE 72, and accordingly, the gNB 71 may freely schedule slots within the given ratio of the slots. Also, in embodiments, the gNB 71 may receive the overheating assistance information presented in Table 6 from the UE 72, and may discontinuously allocate symbols for the UE 72 in a time domain based on the received overheating assistance information. For example, the gNB 71 may assign symbols corresponding to the number of symbols requested by the UE 72 with respect to one slot, and thus, the gNB 71 may freely schedule symbols within the given number of symbols.

In operation S160a, the gNB 71 may transmit data to the UE 72. For example, the gNB 71 may transmit data to the UE 72 via radio resources that are discontinuously allocated in operation S140a on a data channel such as, for example, a PDSCH. In embodiments, before transmitting data, the gNB 71 may provide, to the UE 72, information about the discontinuously allocated radio resources through higher layer signaling and/or a control channel (e.g., PDCCH).

In operation S170a, the UE 72 may operate based on a reduced throughput. For example, in operation S171, the UE 72 may identify the allocated radio resources. The UE 72 may receive information about the discontinuously allocated radio resources through higher layer signaling and/or a control channel, from the gNB 71 (e.g., before operation S160a is performed). Next, in operation S172, the UE 72 may discontinuously process the radio resources. In embodiments, the UE 72 may have an idle state and/or a low-power state in a period corresponding to a slot and/or symbol that is not allocated by the gNB 71, and thus, overheating of the UE 72 may be efficiently prevented or reduced.

Figure 8:
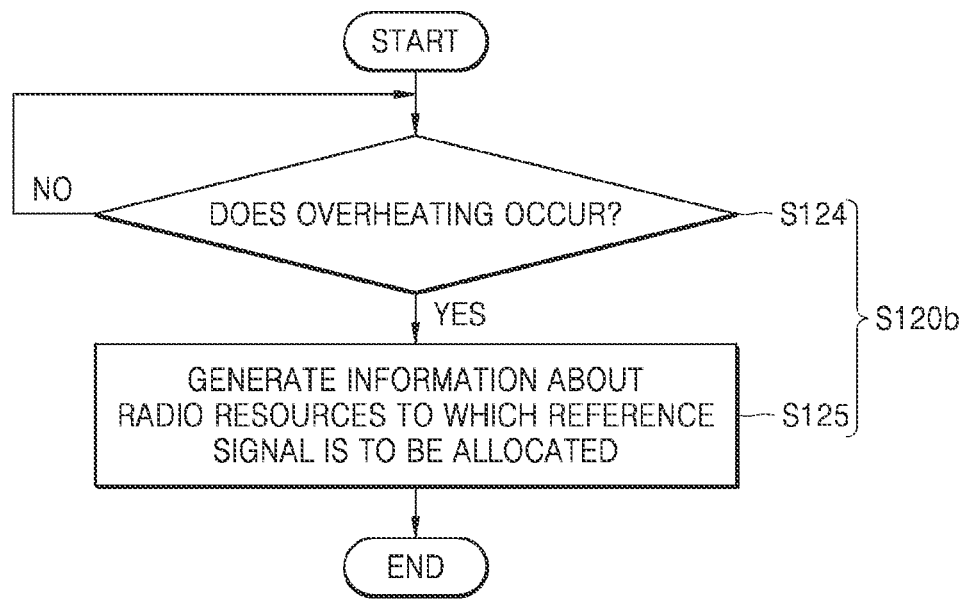
FIG. 8 is a flowchart of a method of thermal management of a UE, according to an embodiment.

FIG. 8 is a flowchart of a method of thermal management of a UE, according to an embodiment. For example, the flowchart of FIG. 8 illustrates an example of operation S120 of FIG. 3. As described above with reference to FIG. 3, overheating assistance information may be generated in operation S120b of FIG. 8. As illustrated in FIG. 8, operation S120b may include operation S124 and operation S125. FIG. 8 will be described with reference to FIG. 3.

In operation S124, whether overheating occurs may be determined. For example, the UE 32 of FIG. 3 may include at least one temperature sensor, and the at least one temperature sensor may detect the temperature of components included in the UE 32 including, for The UE 32 (or the at least one processor 260) may determine whether overheating has occurred based on the temperature detected using the at least one temperature sensor, and as illustrated in FIG. 8, when overheating has occurred, operation S125 may be subsequently performed.

In operation S125, information about radio resources to which a reference signal is to be allocated may be generated. The UE 32 may identify and process a reference signal in a slot allocated thereto. For example, the UE 32 may receive, from the gNB 31, a channel state information reference signal (CSI-RS) and/or a tracking reference signal (TRS). The CSI-RS and the TRS may significantly impact reception performance of the UE 32.

Accordingly, in order for a CSI-RS and/or a TRS to be allocated at a location (e.g., slot and/or symbol) required by the UE 32 by the gNB 31, the UE 32 may generate information about radio resources to which a reference signal is to be allocated. In embodiments, the UE 32 may generate overheating assistance information as shown in Table 7.

TABLE 7

```
OverheatingAssistance ::= SEQUENCE {
...
    CSI-RS_slot-FR1 ENUMERATED {supported} OPTIONAL,
    CSI-RS_symbol-FR1 ENUMERATED {supported} OPTIONAL,
    TRS_slot-FR2 ENUMERATED {supported} OPTIONAL,
    TRS_symbol-FR2 ENUMERATED {supported} OPTIONAL
}
```

In Table 7, CSI-RS_slot-FR1 and CSI-RS_symbol-FR1 may indicate a request for allocating a CSI-RS to a slot and/or symbol to be processed by the UE 32 in FR1, and TRS_slot-FR2 and TRS_symbol-FR2 may indicate a request for allocating a TRS to a slot and/or symbol to be processed by the UE 32 in FR2. In embodiments, each of CSI-RS_slot-FR1, CSI-RS_symbol-FR1, TRS_slot-FR2, and TRS_symbol-FR2 may have a value corresponding to 1 bit indicating whether a request for allocating a corresponding reference signal is possible. In addition, in embodiments, in Table 7, as marked by " . . . ", CSI-RS_slot-FR1, CSI-RS_symbol-FR1, TRS_slot-FR2 and/or TRS_symbol-FR2 may be additionally included in OverheatingAssistance of Table 4. The names and formats presented in Table 7 are examples, and embodiments are not limited to the names or formats shown in Table 7.

Figure 9:
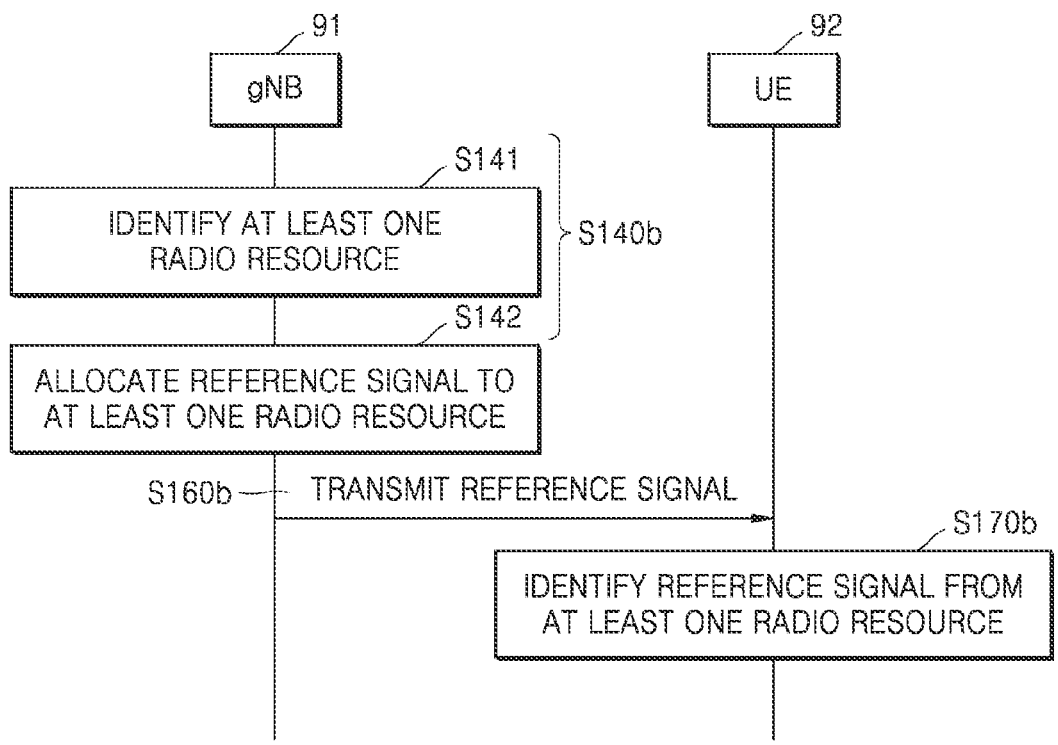
FIG. 9 is a flowchart of a method of thermal management of a UE, according to an embodiment.

FIG. 9 is a flowchart of a method of thermal management of a UE, according to an embodiment. For example, the flowchart of FIG. 9 illustrates an example of operations in which a reference signal is allocated and processed based on overheating assistance information generated in operation S120b of FIG. 8. As illustrated in FIG. 9, a method of thermal management of a UE may include a plurality of operations S140b, S160b and S170b, and operation S140b may include operation S141 and operation S142. Hereinafter, in the description of FIG. 9, it will be assumed that a UE 92 has provided, to a gNB 91, the overheating assistance information generated in operation S120b of FIG. 8. FIG. 9 will be described with reference to FIG. 8.

In operation S140b, the gNB 91 may allocate a reference signal to radio resources based on the overheating assistance information. For example, in operation S141, the gNB 91 may identify at least one radio resource based on the overheating assistance information. For example, the gNB 91 may receive the overheating assistance information presented in Table 7 from the UE 92 and identify at least one slot and/or symbol based on the received overheating assistance information. Next, in operation S142, the gNB 91 may allocate a reference signal to the at least one radio resource. For example, the gNB 91 may allocate a reference signal such as, for example, a CSI-RS and/or a TRS, to the at least one slot and/or symbol that is identified in operation S141. In embodiments, as described above with reference to FIG. 5, when the UE 92 provides, to the gNB 91, overheating assistance information including information about radio resources to be discontinuously processed, the UE 92 may additionally provide, to the gNB 91, overheating assistance information indicating whether a reference signal is allocated to the radio resources to be discontinuously processed, and the gNB 91 may allocate, for the UE 92, a reference signal to at least one radio resource from among the discontinuously allocated radio resources.

In operation S160b, the gNB 91 may transmit a reference signal. For example, the gNB 91 may transmit a reference signal to the UE 92 via the at least one slot and/or symbol allocated in operation S140b, and the UE 92 may receive the reference signal via the at least one slot and/or symbol requested to the gNB 91.

In operation S170b, the UE 92 may identify the reference signal from the at least one radio resource. For example, the UE 92 may identify a reference signal (e.g., a CSI-RS and/or a TRS) in the at least one radio resource (e.g., a slot and/or symbol) based on the overheating assistance information provided to the gNB 91 and allocation information of radio resources transmitted through higher layer signaling and/or a control channel (e.g., PDCCH).

Figure 10:
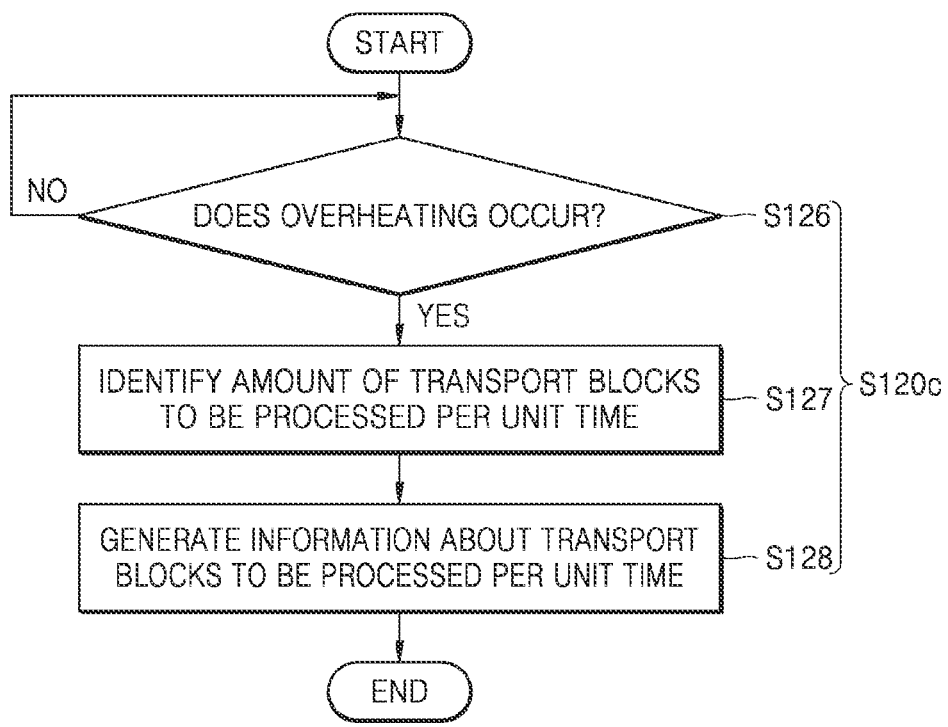
FIG. 10 is a flowchart of a method of thermal management of a UE, according to an embodiment.

FIG. 10 is a flowchart of a method of thermal management of a UE, according to an embodiment. For example, the flowchart of FIG. 10 illustrates an example of operation S120 of FIG. 3. As described above with reference to FIG. 3, overheating assistance information may be generated in operation S120c of FIG. 10. As illustrated in FIG. 10, operation S120c may include a plurality of operations S126, S127 and S128. FIG. 10 will be described with reference to FIG. 3.

In operation S126, whether overheating occurs may be determined. For example, the UE 32 of FIG. 3 may include at least one temperature sensor, and the at least one temperature sensor may detect the temperature of components included in the UE 32 including, for The UE 32 (or the at least one processor 260) may determine whether overheating has occurred based on the temperature detected using the at least one temperature sensor, and as illustrated in FIG. 10, when overheating has occurred, operation S127 may be subsequently performed.

In operation S127, an amount of transport blocks to be processed per unit time may be identified. While an amount of radio resources is identified in the example of FIG. 5, in the example of FIG. 10, the UE 32 may identify an amount of transport blocks corresponding to a higher layer than radio resources. In embodiments, the UE 32 may identify, as an amount of transport blocks to be processed (decoded and/or encoded), an amount (or number) of HARQ processes to be processed, or identify a data channel to be processed, for example, an amount (or number) of PDSCH and/or PUSCH. When the level of overheating is relatively small, the UE 32 may identify the amount of transport blocks less reduced from an amount of transport blocks currently processed per unit time, and when the level of overheating is relatively serious (e.g., when the detected temperature is close to a threshold temperature), the UE 32 may identify the amount of transport blocks more reduced from the amount of transport blocks currently processed per unit time. A unit time may be defined as an arbitrary period having a certain duration in a time domain, and in embodiments, a unit time may include a subframe, a slot, or the like.

In operation S128, information about the amount of transport blocks to be processed per unit time may be generated. For example, the UE 32 may generate, as overheating assistance information, information about transport blocks to be discontinuously processed, to meet the amount of the transport blocks identified in operation S127. An example of operation S128 will be described below with reference to FIG. 11.

Figure 11:
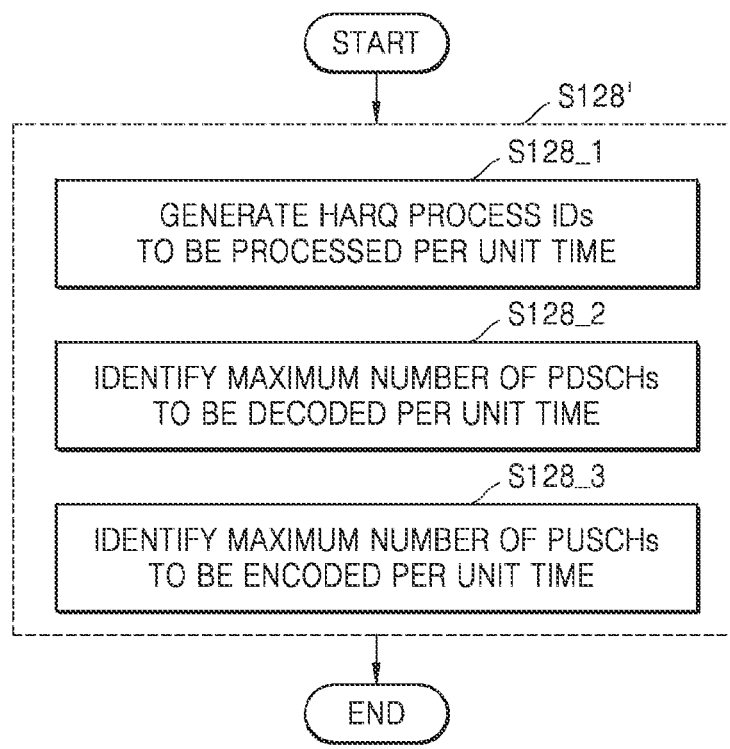
FIG. 11 is a flowchart of a method of thermal management of a UE, according to an embodiment.

FIG. 11 is a flowchart of a method of thermal management of a UE, according to an embodiment. For example, the flowchart of FIG. 11 illustrates an example of operation S128 of FIG. 10. As described above with reference to FIG. 10, in operation S128' of FIG. 11, information about transport blocks to be processed may be generated. In an embodiment, operation S128' may include a plurality of operations S128_1, S128_2 and S128_3 as illustrated in FIG. 11. However, embodiments are not limited thereto. For example, in embodiments, unlike FIG. 11, operation S128' may include only some of the plurality of operations S128_1 through S128_3. Hereinafter, FIG. 11 will be described with reference to FIGS. 3 and 10.

In operation S128_1, HARQ process IDs (index or number) to be processed per unit time may be generated. According to "5G; NR; Multiplexing and channel coding (3GPP TS 38.212 Release 15)", the disclosure of which is incorporated by reference herein in its entirety and is referred to hereinafter as "Document 3", the UE 32 may process up to 16 HARQ processes. To reduce or prevent overheating, the UE 32 may request the gNB 31 so that the UE 32 may decode all PDCCHs and then process only some of the 16 HARQ processes. For example, the UE 32 may generate overheating assistance information as shown in Table 8.

TABLE 8

OverheatingAssistance ::= SEQUENCE {
...
SelectedHARQProcess_ID CHOICE {
  HARQ_Bitmap BIT STRING (SIZE (160))
}
}

In Table 8, HARQ_Bitmap may be a 16-bit bit map corresponding to 16 HARQ processes, and each bit of the HARQ-bitmap may indicate whether a HARQ process corresponding to that bit is processed. In embodiments, as marked by " . . . " in Table 8, SelectHARQProcess_ID may be additionally included in OverheatingAssistance of Table 4. The names and formats presented in Table 8 are examples, and embodiments are not limited to the names or formats shown in Table 8.

In operation S128_2, a maximum number of PDSCHs to be decoded per unit time may be identified. For example, the UE 32 may identify a maximum number of PDSCHs that are decodable per unit time to reduce or prevent overheating. In embodiments, the UE 32 may calculate a maximum number of PDSCHs based on a predefined function from a detected temperature or may obtain a maximum number of PDSCHs based on a predefined lookup table. According to Document 2, the UE 32 may report, to the gNB 31, features as shown in Table 9 from among features of a DL supported by the UE 32.

TABLE 9

FeatureSetDownlink ::= SEQUENCE {
...
pdsch-ProcessingType1-DifferentTB-PerSlot SEQUENCE {
  scs-15kHz ENUMERATED {upto2, upto4, upto7} OPTIONAL,
  scs-30kHz ENUMERATED {upto2, upto4, upto7} OPTIONAL,
  scs-60kHz ENUMERATED {upto2, upto4, upto7} OPTIONAL,
  scs-120kHz ENUMERATED {upto2, upto4, upto7} OPTIONAL
}
...
}

TABLE 9-continued

```
FeatureSetDownlink-v1540 ::= SEQUENCE {
    ...
    pdsch-ProcessingType2-Limited SEQUENCE {
        differentTB-PerSlot-SCS-30kHz ENUMERATED {upto1, upto2, upto4, upto7}
    } OPTIONAL,
    ...
}
```

In Table 9, information included in pdsch-ProcessingType1-DifferentTB-PerSlot may correspond to a maximum number of PDSCHs that are decodable in one slot according to a sub-carrier spacing (SCS) in a first processing type (processing type 1), and information included in pdsch-ProcessingType2-Limited may correspond to a maximum number of PDSCHs that are decodable in one slot when an SCS is 30 kHz in a second processing type (processing type 2). In embodiments, the UE 32 may generate, as overheating assistance information, a maximum number of PDSCHs based on overheating within a range reported at pdsch-ProcessingType1-DifferentTB-PerSlot and/or pdsch-ProcessingType2-Limited of Table 9. For example, the UE 32 may generate overheating assistance information as shown in Table 10.

TABLE 10

```
OverheatingAssistance ::= SEQUENCE {
    ...
    MaxPDSCHperSlot-CNT SEQUENCE {
        MaxPDSCHperSlot-ID-FR1  ReducedPDSCHperSlotRatio,
        MaxPDSCHperSlot-ID-FR2  ReducedPDSCHperSlotRatio,
    } OPTIONAL,
}
ReducedPDSCHHARQRatio ::= ENUMERATED {s10, s20, s30, s40, s50, s60, s70, s80, s90, s100}
```

In Table 10, MaxPDSCHperSlot-ID-FR1 and MaxPDSCHperSlot-ID-FR2 may respectively indicate maximum ratios of PDSCHs per slot in FR1 and FR2. In embodiments, like ReducedSlotAllocatedRatio defined in Table 10, MaxPDSCHperSlot-ID-FR1 and MaxPDSCHperSlot-ID-FR2 may each have a value corresponding to n*10% (1≤n≤10, n is an integer), and may be multiplied by one of values included in ProcessingType1-DifferentTB-PerSlot and/or pdsch-ProcessingType2-Limited of Table 9 according to an SCS to thereby calculate a maximum number of PDSCHs that are actually decodable by the UE 32. Also, in embodiments, the UE 32 may generate overheating assistance information respectively corresponding to the first processing type and the second processing type. In addition, in embodiments, in Table 10, as marked by " . . . ", MaxPDSCHperSlot-ID-FR1 and MaxPDSCHperSlot-ID-FR2 may be additionally included in OverheatingAssistance of Table 4. The names and formats presented in Table 10 are examples, and embodiments are not limited to the names or formats shown in Table 10.

In operation S128_3, a maximum number of PUSCHs to be encoded per unit time may be identified. For example, the UE 32 may identify a maximum number of PUSCHs to be encoded per unit time to prevent or reduce overheating. In embodiments, the UE 32 may calculate a maximum number of PUSCHs from a detected temperature based on a predefined function or may obtain a maximum number of PUSCHs based on a predefined lookup table. According to Document 2, the UE 32 may report, to the gNB 31, features as shown in Table 11 from among features of an UL supported by the UE 32.

TABLE 11

```
FeatureSetUplink ::= SEQUENCE {
    ...
    pusch-ProcessingType1-DifferentTB-PerSlot SEQUENCE {
        scs-15kHz ENUMERATED {upto2, upto4, upto7} OPTIONAL,
        scs-30kHz ENUMERATED {upto2, upto4, upto7} OPTIONAL,
        scs-60KHz ENUMERATED {upto2, upto4, upto7} OPTIONAL,
        scs-120KHz ENUMERATED {upto2, upto4, upto7} OPTIONAL
    }
    ...
}
```

In Table 11, information included in pusch-ProcessingType1-DifferentTB-PerSlot may correspond to a maximum number of PUSCHs that are encodable in one slot according to an SCS in the first processing type. In embodiments, the UE 32 may generate, as overheating assistance information, a maximum number of PUSCHs based on overheating within a range reported at pusch-ProcessingType1-DifferentTB-PerSlot of Table 11. For example, the UE 32 may generate overheating assistance information as shown in Table 12.

TABLE 12

OverheatingAssistance ::= SEQUENCE {
    ...
    MaxPUSCHperSlot-CNT SEQUENCE {
        MaxPUSCHperSlot-ID-FR1 ReducedPUSCHperSlotRatio,
        MaxPUSCHperSlot-ID-FR2 ReducedPUSCHperSlotRatio,
    } OPTIONAL,
}
ReducedPUSCHHARQRatio ::= ENUMERATED {s10, s20, s30, s40, s50, s60, s70, s80, s90, s100}

In Table 12, MaxPUSCHperSlot-ID-FR1 and MaxPUSCHperSlot-ID-FR2 may respectively indicate maximum ratios of PUSCHs per slot. In embodiments, like ReducedSlotAllocatedRatio defined in Table 12, MaxPUSCHperSlot-ID-FR1 and MaxPUSCHperSlot-ID-FR2 may each have a value corresponding to n*10% (1≤n≤10, n is an integer), and may be multiplied by one of values included in pusch-ProcessingType1-DifferentTB-PerSlot of Table 11 according to an SCS to thereby calculate a maximum number of PUSCHs that are actually encodable by the UE 32. While Document 2 does not define information corresponding to a maximum number of PUSCHs that are encodable in one slot in the second processing type, it will be understood that the maximum number of PUSCHs based on overheating of the UE 32 in the second processing type may be calculated in a similar manner to that described above with reference to Tables 9 through 12 when information corresponding to a maximum number of PUSCHs that are encodable in one slot in the second processing type is later defined.

Figure 12:
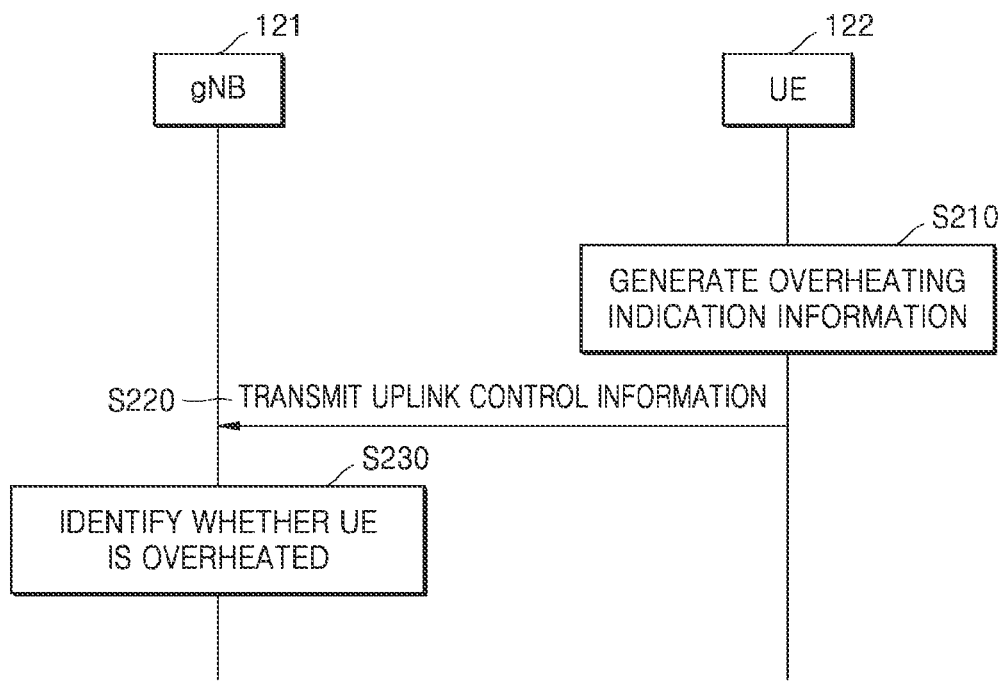
FIG. 12 is a flowchart of a method of thermal management of a UE, according to an embodiment.

FIG. 12 is a flowchart of a method of thermal management of a UE 122, according to an embodiment. As illustrated in FIG. 12, the method of thermal management of the UE 122 may include a plurality of operations S210, S220 and S230.

When a gNB 121 does not support or accept the overheating assistance information provided by the UE 122, even though the UE 122 has provided the overheating assistance information to the gNB 121, in an embodiment, to reduce or prevent overheating, the UE 122 does not decode some of PDSCH and/or HARQ processes received from the gNB 121, and may transmit a resultant negative acknowledgement (NACK) to the gNB 121. Accordingly, the gNB 121 may merely determine, based on the NACK received from the UE 122, that a channel status between the gNB 121 and the UE 122 is poor and may not be able to identify overheating of the UE 122. To account for this, the UE 122 may transmit, to the gNB 121, uplink control information (UCI) including information indicating its overheating state, that is, overheating indication information.

Referring to FIG. 12, the UE 122 may generate overheating indication information in operation S210, and in operation S220, the UE 122 may transmit UCI including overheating indication information to the gNB 121. For example, the UE 122 may generate overheating indication (OHI) as 1-bit information included in UCI. In embodiments, OHI may be subsequent to a scheduling request (SR) included in UCI, and thus, subclause 6.3.1.1.1 of Document 3 may be represented as in Table 13 below.

TABLE 13

| 6.3.1.1.1 HARQ-ACK/SR/OHI only |
|---|
| If only HARQ-ACK bits are transmitted on a PUCCH, the UCI bit sequence $a_0, a_1, a_2, a_3, \ldots, a_{A-1}$ is determined by setting $a_i = \tilde{o}_i^{ACK}$ for $i = 0, 1, \ldots, O^{ACK} - 1$ and $A = O^{ACK}$, where the HARQ-ACK bit sequence $\tilde{o}_0^{ACK}, \tilde{o}_1^{ACK}, \ldots, \tilde{o}_{O^{ACK}-1}^{ACK}$ is given by Subclause 9.1 of [5, TS38.213]. |
| If only HARQ-ACK and SR bits are transmitted on a PUCCH, the UCI bit sequence $a_0, a_1, a_2, a_3, \ldots, a_{A-1}$ is determined by setting $a_i = \tilde{o}_i^{ACK}$ for $i = 0, 1, \ldots, O^{ACK} - 1$, $a_i = \tilde{o}_i^{SR}$ for $i = O^{ACK}, O^{ACK} + 1, \ldots, O^{ACK} + O^{SR} - 1$, and $A = O^{ACK} + O^{SR}$, where the HARQ-ACK bit sequence $\tilde{o}_0^{ACK}, \tilde{o}_1^{ACK}, \ldots, \tilde{o}_{O^{ACK}-1}^{ACK}$ is given by Subclause 9.1 of [5, TS 38.213], and the SR bit sequence $\tilde{o}_0^{SR}, \tilde{o}_1^{SR}, \ldots, \tilde{o}_{O^{SR}-1}^{SR}$ is given by Subclause 9.2.5.1 of [5, TS 38.213]. |
| If only HARQ-ACK, SR and OHI bits are transmitted on a PUCCH, the UCI bit sequence $a_0, a_1, a_2, a_3, \ldots, a_{A-1}$ is determined by setting $a_i = \tilde{o}_i^{ACK}$ for $i = 0, 1, \ldots, O^{ACK} - 1$, $a_i = \tilde{o}_i^{SR}$ for $i = O^{ACK}, O^{ACK} + 1, \ldots, O^{ACK} + O^{SR} - 1$, $a_i = \tilde{o}_i^{OHI}$ for $i = O^{OHI}, O^{ACK} + 1, \ldots, O^{ACK} + O^{SR} + O^{OHI} - 1$, and $A = O^{ACK} + O^{SR} + O^{OHI}$, where the HARQ-ACK bit sequence $\tilde{o}_0^{ACK}, \tilde{o}_1^{ACK}, \ldots, \tilde{o}_{O^{ACK}-1}^{ACK}$ is given by Subclause 9.1 of [5, TS 38.213], and the SR bit sequence $\tilde{o}_0^{SR}, \tilde{o}_1^{SR}, \ldots, \tilde{o}_{O^{SR}-1}^{SR}$ is given by Subclause 9.2.5.1 of [5, TS 38.213], and the OHI bit sequence $\tilde{o}_0^{OHI}, \tilde{o}_0^{OHI}, \ldots, \tilde{o}_{O^{SR}-1}^{OHI}$ $\tilde{o}_0^{SR}, \tilde{o}_1^{SR}, \ldots, \tilde{o}_{O^{SR}-1}^{SR}$ is given by Subclause 9.X.X.X of [5, TS 38.213]. |

Accordingly, 1 bit corresponding to OHI may be added after SR, and whether the UE 122 is overheated may be reported to the gNB 121 through a minimum change in the previous UCI. For example, according to Table 13, a polar encoder/decoder for polar coding of a control channel in 5G NR may not be changed. In embodiments, the UE 122 may transmit OHI indicating overheating with NACK to the gNB 121.

In operation S230, the gNB 121 may identify whether the UE 122 is overheated. For example, the gNB 121 may identify whether the UE 122 is overheated based on the OHI included in the UCI received in operation S220. In response to the OHI indicating overheating of the UE 122, the gNB 121 may reduce radio resources and/or transport blocks for the UE 122, and lower a data rate in communication with the UE 122.

Figure 13:
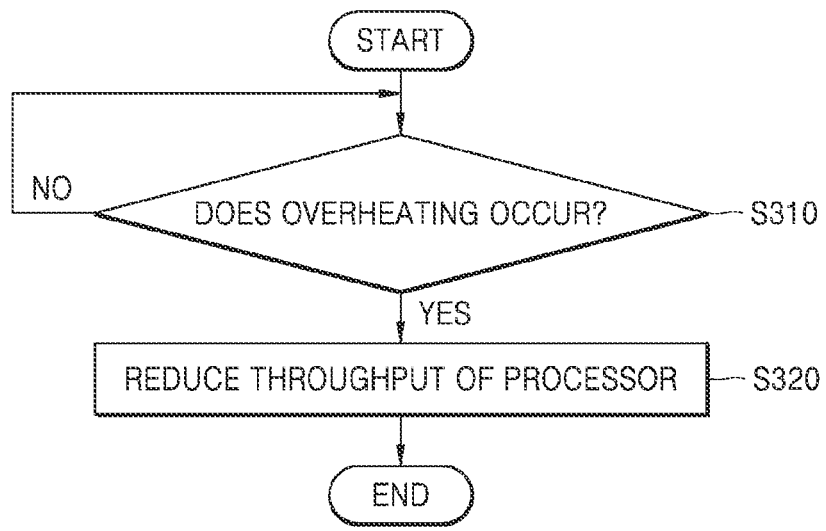
FIG. 13 is a flowchart of a method of thermal management of a UE, according to an embodiment.

FIG. 13 is a flowchart of a method of thermal management of a UE, according to an embodiment. The flowchart of FIG. 13 illustrates an example of an operation performed by a UE itself to reduce or prevent overheating of the UE. In embodiments, the method of FIG. 13 may be performed using the at least one processor 260 of FIG. 1. FIG. 13 will be described by referring to FIG. 1.

In operation S310, whether overheating occurs may be determined. For example, the terminal 200 may include at least one temperature sensor, and the at least one temperature sensor may detect a temperature of the transceiver 240 and/or the at least one processor 260. The at least one processor 260 may determine whether overheating has occurred, based on the temperature detected using the at least one temperature sensor, and as illustrated in FIG. 13, when overheating has occurred, operation S320 may be subsequently performed.

In operation S320, a throughput of a processor may be reduced. For example, the at least one processor 260 may reduce a throughput to reduce or prevent overheating. In embodiments, as described above by referring to, for example, FIG. 3, the at least one processor 260 may request the base station 100 to reduce radio resources and/or transport blocks through overheating assistance information to reduce the throughput, or in embodiments, the at least one processor 260 may reduce the throughput without input from the base station 100. Hereinafter, examples of operation S320 will be described with reference to FIGS. 14A through 16D.

Figure 14A:
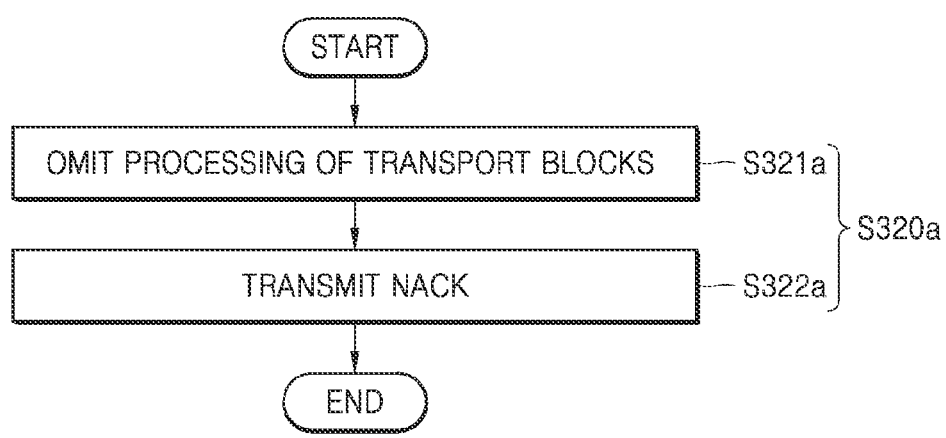
FIGS. 14A and 14B are flowcharts of a method of thermal management of a UE, according to embodiments.
Figure 14B:
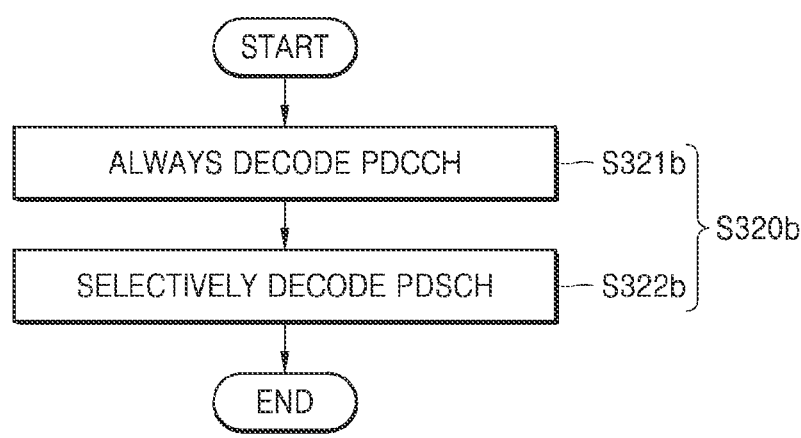

FIGS. 14A and 14B are flowcharts of a method of thermal management of a UE, according to embodiments. The flowcharts of FIGS. 14A and 14B respectively show an example of operation S320 of FIG. 13. In operation S320a of FIG. 14A and operation S320b of FIG. 14B, the at least one processor 260 of FIG. 1 may limit signal processing to reduce or prevent overheating.

Referring to FIG. 14A, operation S320a may include operation S321a and operation S322a. In operation S321a, processing of transport blocks may be omitted, and in operation S322a, NACK may be transmitted. For example, when overheating has occurred or overheating is expected, the at least one processor 260 may omit decoding of PDCCH and PDSCH and transmit NACK to the base station 100 until the temperature is lowered to a predefined temperature. That is, until the temperature of the terminal 200 is lowered to a certain level, operation S320a of FIG. 14A may be repeated.

Referring to FIG. 14B, operation S320b may include operation S321b and operation S322b. In operation S321b, PDCCH may always be decoded, and in operation S322b, PDSCH may be selectively decoded. For example, the at least one processor 260 may identify a slot and/or symbol to which a PDCCH is allocated, based on a search space (SS) bit map received through higher layer signaling. The at least one processor 260 may always decode a slot and/or symbol to which a PDCCH is allocated, and may selectively decode a PDSCH subsequent to the PDCCH based on certain criteria. For example, the at least one processor 260 may selectively decode a PDSCH based on a detected temperature, a temperature increase rate and/or decrease rate, etc.

Figure 15A:
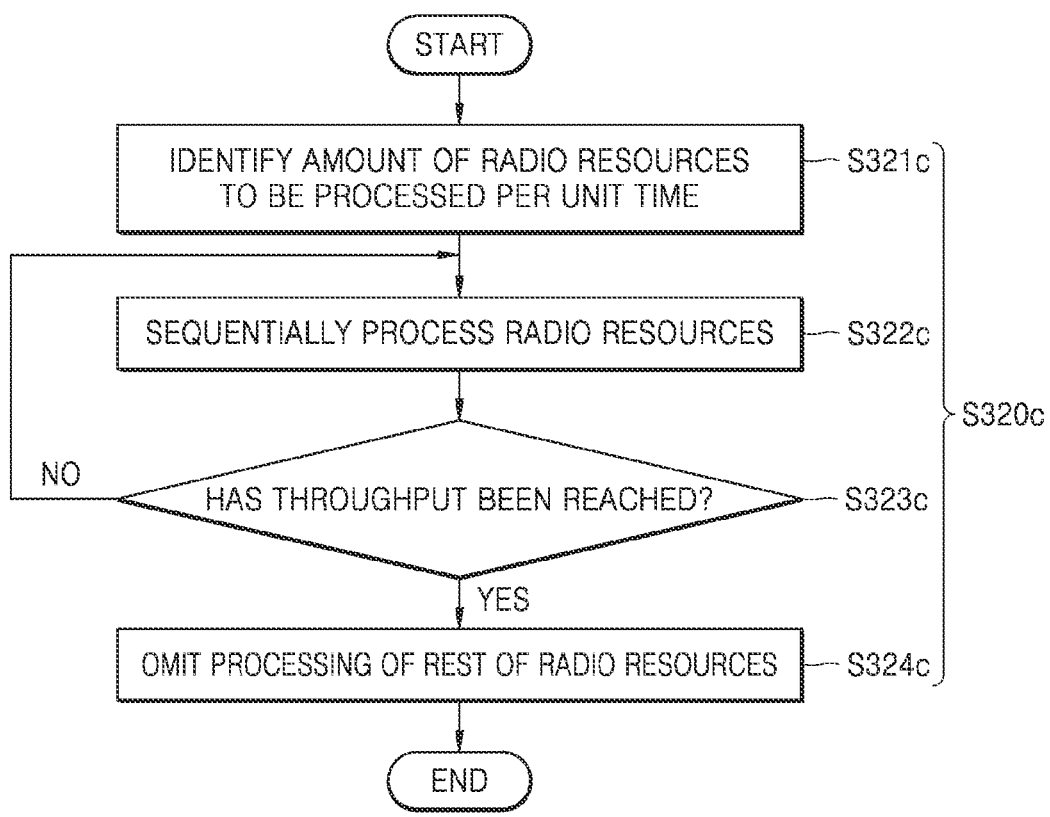
FIGS. 15A and 15B are flowcharts of a method of thermal management of a UE, according to embodiments.
Figure 15B:
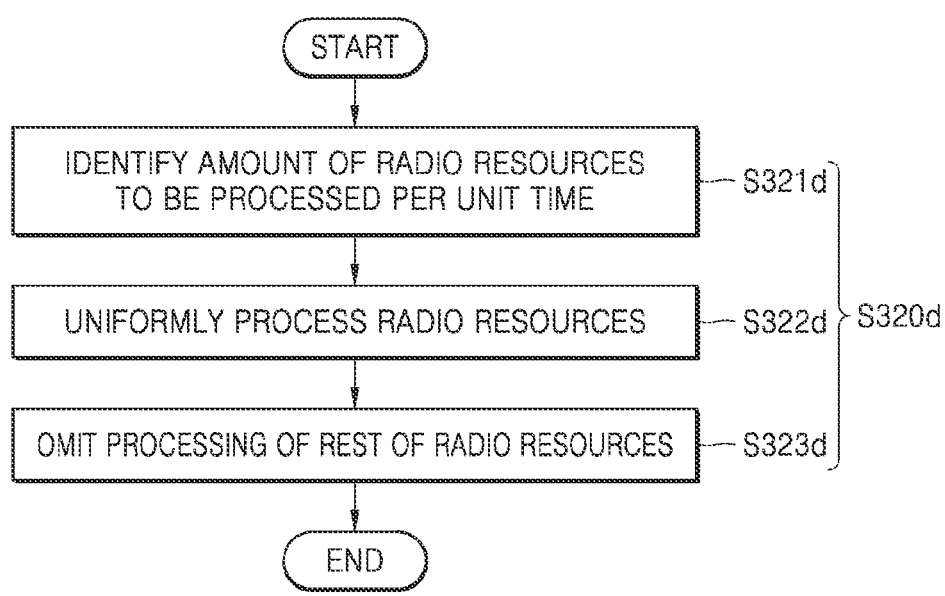

FIGS. 15A and 15B are flowcharts of a method of thermal management of a UE, according to embodiments. The flowcharts of FIGS. 15A and 15B respectively show examples of operation S320 of FIG. 13. In operation S320c of FIG. 15A and operation S320d of FIG. 15B, the at least one processor 260 of FIG. 1 may identify radio resources to be processed per unit time and reduce a throughput based on the identified radio resources. Hereinafter, for convenience of explanation, a further description of elements and aspects previously described may be omitted.

Referring to FIG. 15A, operation S320c may include a plurality of operations S321c, S322c, S323c and S324c. In operation S321c, an amount of radio resources to be processed per unit time may be identified. For example, like operation S122 of FIG. 5, the at least one processor 260 may identify, based on a level of overheating, an amount of radio resources to be processed per unit time (e.g., reducedSlotRatio-FR1 and/or reducedSlotRatio-FR2). Also, in embodiments, the at least one processor 260 may provide, to the base station 100, overheating assistance information indicating the identified amount of radio resources.

In operation S322c, the radio resources may be sequentially processed. For example, the at least one processor 260 may sequentially process the radio resources within a range of the amount of radio resources identified in operation S321c. In embodiments, the at least one processor 260 may identify a slot and/or symbol to which a PDCCH is allocated, based on a SS bit map received through higher layer signaling, and sequentially process PDCCH in the identified slot and/or symbol.

In operation S323c, whether the throughput has been reached may be determined. For example, the at least one processor 260 may determine whether the amount of radio resources identified in operation S321c is met by the radio resources processed in operation S322c. As illustrated in FIG. 15A, when the throughput is not reached, operation S322c and operation S323c may be sequentially performed again, and when the throughput is reached, operation S324c may be subsequently performed.

In operation S324c, the processing of the rest of the radio resources may be omitted. Accordingly, when an amount of slots and/or symbols identified based on a SS bit map is greater than the amount of radio resources identified in operation S321c, after some radio resources are sequentially processed, the processing of the rest of the radio resources may be omitted, and NACK may be transmitted to the base station 100. On the other hand, when an amount of slots and/or symbols identified based on a SS bit map is less than the amount of radio resources identified in operation S321c, all of the radio resources allocated by the base station 100 may be processed by the at least one processor 260.

Referring to FIG. 15B, operation S320d may include a plurality of operations S321d, S322d and S323d. In operation S321d, an amount of radio resources to be processed per unit time may be identified, and the radio resources may be uniformly processed in operation S322d. For example, when an amount of slots and/or symbols identified based on a SS bit map is greater than the amount of radio resources identified in operation S321d, the at least one processor 260 may uniformly process, in a time domain and/or frequency domain, radio resources corresponding to the amount of the radio resources identified in operation S321d from among the radio resources allocated by the base station 100.

In operation S323d, the processing of the rest of the radio resources may be omitted. Accordingly, when the amount of the slots and/or symbols identified based on the SS bit map is greater than the amount of radio resources identified in operation S321d, after some radio resources are equally processed, the processing of the rest of radio resources may be omitted, and NACK may be transmitted to the base station 100. On the other hand, when an amount of slots and/or symbols identified based on a SS bit map is less than the amount of radio resources identified in operation S321d, all of the radio resources allocated by the base station 100 may be processed by the at least one processor 260.

FIGS. 16A through 16D are flowcharts of a method of thermal management of a UE, according to embodiments. The flowcharts of FIGS. 16A through 16D respectively show examples of operation S320 of FIG. 13. In operation S320e of FIG. 16A, operation S320f of FIG. 16B, operation S320g of FIG. 16C, and operation S320h of FIG. 16D, the at least one processor 260 of FIG. 1 may identify transport blocks to be processed per unit time, and reduce a throughput based on the identified transport blocks. Hereinafter, for convenience of explanation, a further description of elements and aspects previously described may be omitted.

Figure 16A:
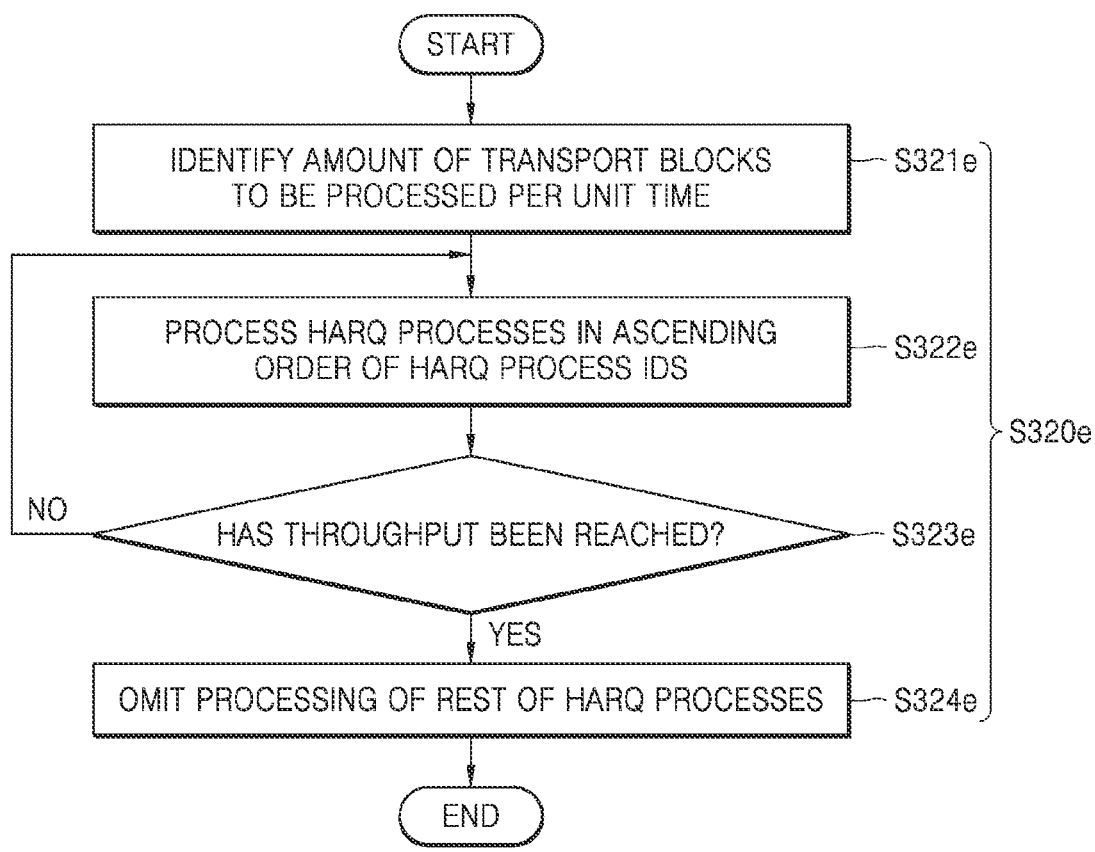
FIGS. 16A through 16D are flowcharts of a method of thermal management of a UE, according to embodiments.

Referring to FIG. 16A, operation S320e may include a plurality of operations S321e, S322e, S323e and S324e. In operation S321e, an amount of transport blocks to be processed per unit time may be identified. For example, like operation S127 of FIG. 10, the at least one processor 260 may identify an amount of transport blocks to be processed per unit time based on a level of overheating (e.g., MaxPDSCHperSlot-CNT of Table 10). Also, in embodiments, the at least one processor 260 may provide, to the base station 100, overheating assistance information indicating the identified amount of transport blocks.

In operation S322e, HARQ processes may be processed in an ascending order of HARQ process IDs. For example, the at least one processor 260 may sequentially decode HARQ processes in an ascending order of HARQ process IDs within a range of the amount of the transport blocks identified in operation S321e. In operation S323e, whether the throughput has been reached may be determined. For example, the at least one processor 260 may determine whether the amount of the transport blocks identified in operation S321e is met by the HARQ processes processed in operation S322e. As illustrated in FIG. 16A, when the throughput is not reached, operation S322e and operation S323e may be sequentially performed again, and when the throughput is reached, operation S324e may be subsequently performed.

In operation S324e, the processing of the rest of the HARQ processes may be omitted. Accordingly, the HARQ processes may be processed in an ascending order of HARQ process IDs, and then the processing of the rest of the HARQ processes may be omitted and NACK may be transmitted to the base station 100. On the other hand, when HARQ processes received from the base station 100 are equal to or less than the amount of the transport blocks identified in operation S321e, all of the transport blocks may be processed.

Figure 16B:
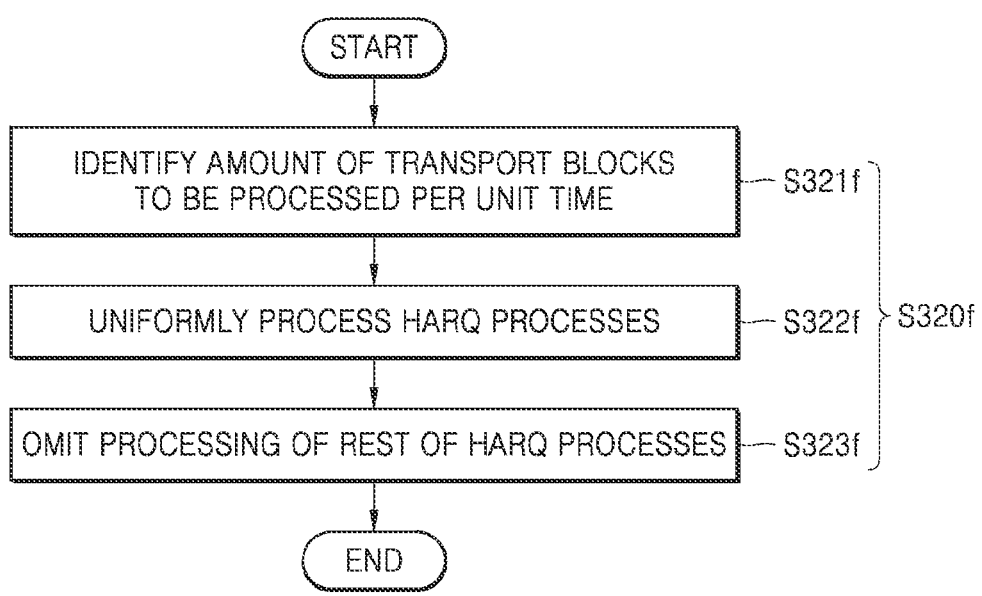

Referring to FIG. 16B, operation S320f may include a plurality of operations S321f, S322f and S323f. In operation S321f, an amount of transport blocks to be processed per unit time may be identified, and equi-spaced HARQ processes may be uniformly processed in operation S322f. For example, the at least one processor 260 may identify a step size of an HARQ process ID for uniform processing of the HARQ processes within a range of the amount of the transport blocks identified in operation S321f, and may process HARQ processes respectively corresponding to IDs of the equi-spaced HARQ processes based on the step size. Next, in operation S323f, the processing of the rest of the HARQ processes may be omitted.

Figure 16C:
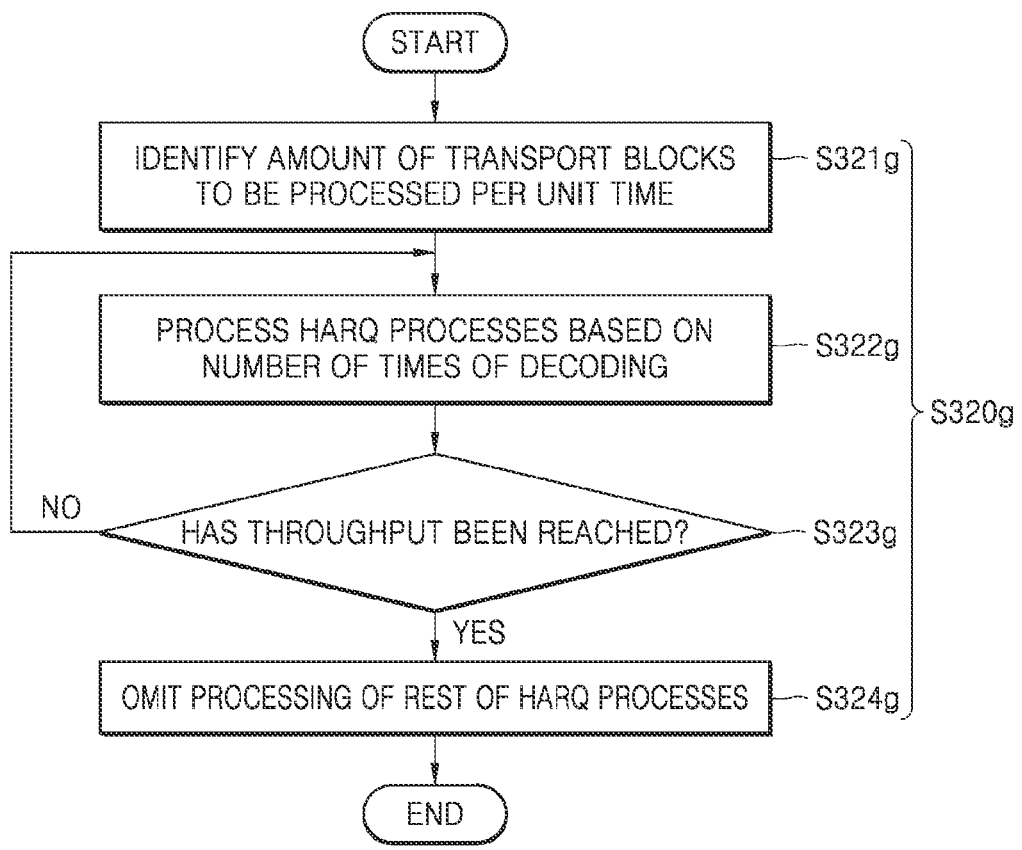

Referring to FIG. 16C, operation S320g may include a plurality of operations S321g, S322g, S323g and S324g. In operation S321g, an amount of transport blocks to be processed per unit time may be identified, and HARQ processes may be processed based on a number of times of decoding the HARQ processes in operation S322g. Due to HARQ retransmission, the at least one processor 260 may simultaneously receive an initially transmitted HARQ process and a retransmitted HARQ process, and process the HARQ processes based on the number of times of decoding the HARQ processes. For example, the at least one processor 260 may store a number of times of decoding of each HARQ process, and decode the HARQ processes such that a maximum number of times of decoding a PDSCH does not exceed the amount of transport blocks identified in operation S321g (e.g., MaxPDSCHperSlot-CNT of Table 10). In operation S323g, whether the throughput has been reached may be determined, and when the throughput is not reached, operations S322g and S323g may be sequentially performed again, and when the throughput is reached, the processing of the rest of the HARQ processes may be omitted in operation S324g.

Figure 16D:
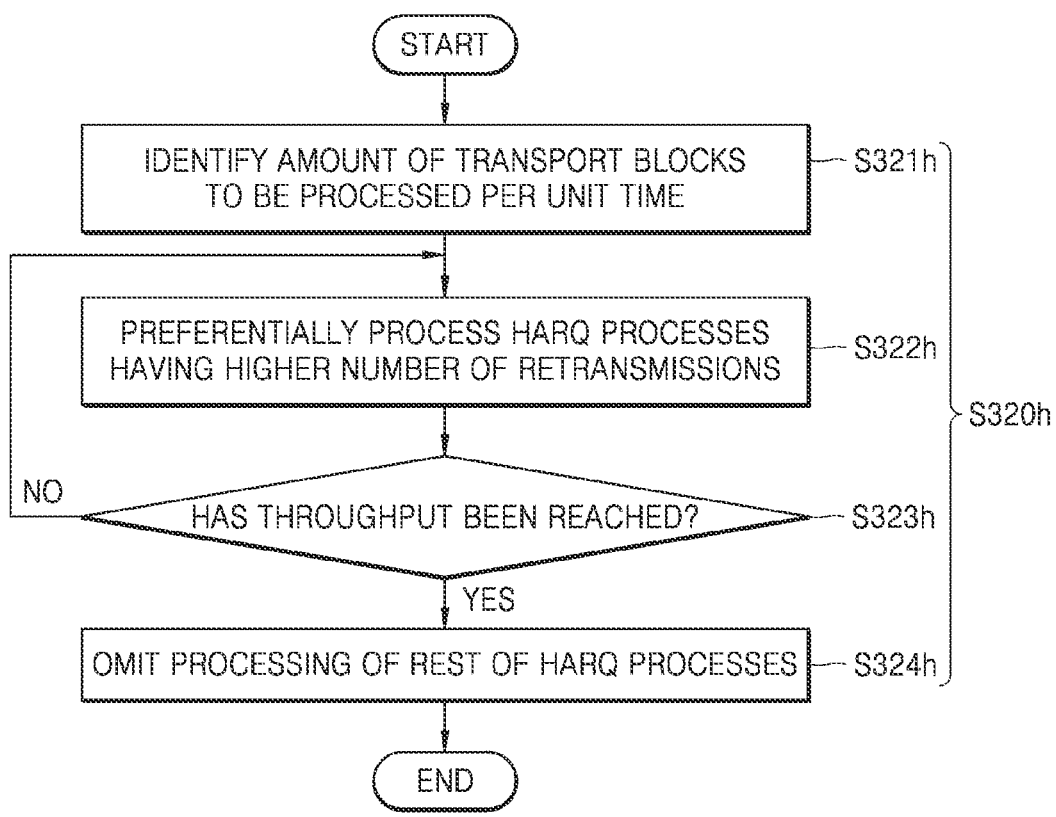

Referring to FIG. 16D, operation S320h may include a plurality of operations S321h, S322h, S323h and S324h. In operation S321h, an amount of transport blocks to be processed per unit time may be identified, and HARQ processes having a higher number of retransmissions may be preferentially processed in operation S322h. In regard to HARQ retransmission, initial transmission has a relatively low priority, and a retransmission having higher number of times may have a higher priority. Accordingly, the at least one processor 260 may preferentially decode a HARQ process having a higher number of retransmissions within a range of the amount of transport blocks identified in operation S321h. In operation S323h, whether the throughput has been reached may be determined, and when the throughput is not reached, operations S322h and S323h may be sequentially performed again, and when the throughput is reached, the processing of the rest of the HARQ processes may be omitted in operation S324h.

Figure 17:
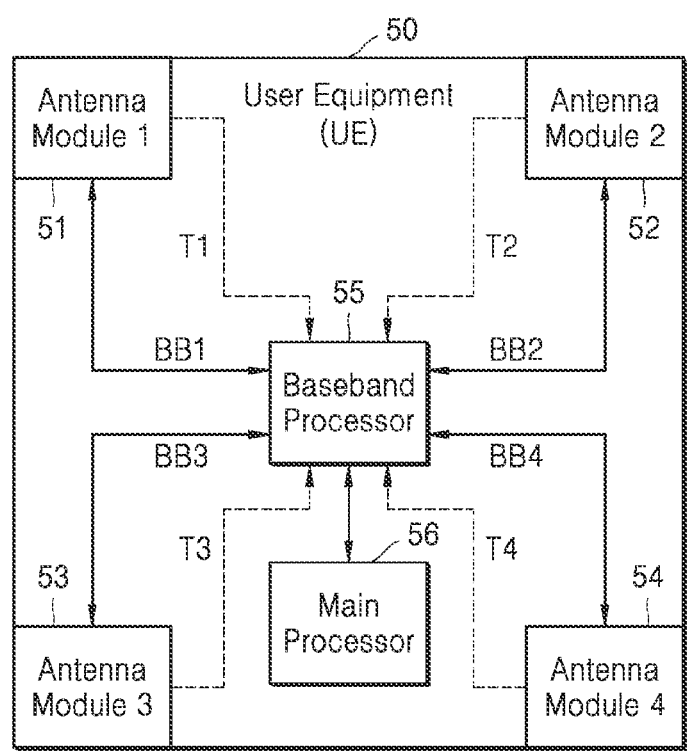
FIG. 17 is a block diagram illustrating an example of a UE, according to an embodiment.

FIG. 17 is a block diagram illustrating an example of a user equipment 50, according to an embodiment. As illustrated in FIG. 17, the user equipment 50 may include first through fourth antenna modules 51, 52, 53 and 54, a baseband processor 55, and a main processor 56. In embodiments, the first through fourth antenna modules 51 through 54 may be spaced apart from each other and independently packaged. In addition, in embodiments, the baseband processor 55 and the main processor 56 may be each independently packaged or packaged together.

The first through fourth antenna modules 51 through 54 may each include at least one antenna, and respectively transmit or receive first through fourth baseband signals BB1, BB2, BB3 and BB4 to and from the baseband processor 55. In embodiments, unlike FIG. 17, the user equipment 50 may include a back-end module that transmits or receives intermediate frequency signals to or from the first through fourth antenna modules 51 through 54, and the back-end module may transmit or receive a baseband signal to or from the baseband processor 55. In addition, in embodiments, the first through fourth baseband signals BB1 through BB4 may be digital signals, and the first through fourth antenna modules 51 through 54 may each include a digital-to-analog converter (DAC) that respectively converts the first through fourth baseband signals BB1 through BB4 into analog signals. The first through fourth antenna modules 51 through 54 may each include temperature sensors, and respectively provide, to the baseband processor 5, first through fourth temperatures T1, T2, T3 and T4 sensed using the temperature sensors.

The main processor 56 may control the user equipment 50, and communicate with the baseband processor 55. For example, the main processor 56 may generate a payload to be transmitted through wireless communication and provide the payload to the baseband processor 55, or receive, from the baseband processor 55, a payload received through wireless communication. In addition, the main processor 56 may receive a temperature sensed from at least one temperature sensor included in the user equipment 50, and may provide the baseband processor 55 with the sensed temperature and/or information about an overheating state determined based on the sensed temperature. In embodiments, the main processor 56 may be an application processor (AP).

The baseband processor 55 may identify overheating based on the first through fourth temperatures T1 through T4 and/or information provided by the main processor 56. In addition, the baseband processor 55 may include a temperature sensor and identify overheating further based on a temperature provided by the temperature sensor included in the baseband processor 55 itself. As described above with reference to the drawings, the baseband processor 55 may perform the method of thermal management described above with reference to the drawings, to reduce or prevent overheating. For example, the baseband processor 55 may request a base station to reduce a data rate through at least one of the first through fourth antenna modules 51 through 54 or may reduce the throughput by itself.

Figure 18:
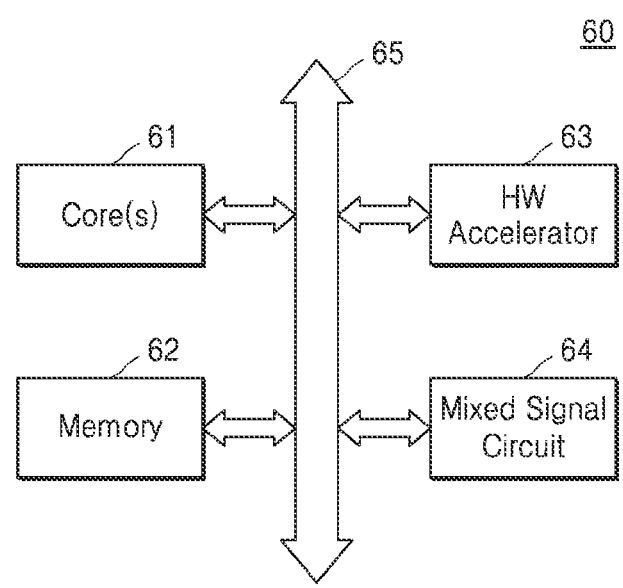
FIG. 18 is a block diagram illustrating a processor, according to an embodiment.

FIG. 18 is a block diagram illustrating a processor 60, according to an embodiment. As illustrated in FIG. 18, the processor 60 may include at least one core 61, a memory 62, a hardware accelerator 63, and a mixed signal circuit 64. The at least one core 61, the memory 62, the hardware accelerator 63, and the mixed signal circuit 64 may communicate with each other via a bus 65. All components of the processor 60 may be included in one semiconductor package, or two or more components of the processor 60 may be respectively included in different semiconductor packages.

The at least one core 61 may execute instructions. For example, the at least one core 61 may execute a program stored in the memory 62 and including a series of instructions. The memory 62 may include a volatile memory such as, for example, a static random access memory (SRAM), a dynamic random access memory (DRAM), or the like, or a non-volatile memory such as, for example, a flash memory or a resistive random access memory (RRAM), or the like. The hardware accelerator 63 may include a logic circuit designed to perform certain operations such as, for example, encoding, decoding or transform, at high speed, and may generate output data by processing input data stored in the memory 62 and store the output data in the memory 62. The mixed signal circuit 64 may include a circuit processing not only digital signals, but also analog signals including, for example, an analog-to-digital converter (ADC) converting a baseband signal, which is an analog signal, into a digital signal, a temperature sensor including an element for sensing a temperature of the processor 60, or the like.

The method of thermal management of a UE described above with reference to the drawings may be performed using the at least one core 61 and/or the hardware accelerator 63. For example, the at least one core 61 may perform at least some of the operations illustrated in the above-described flowcharts by executing the instructions stored in the memory 62, and the hardware accelerator 63 may include a logic circuit designed to perform at least some of the operations illustrated in the above-described flowcharts.

As is traditional in the field of the present inventive concept, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the inventive concept has been particularly shown and described with reference to the embodiments thereof, it will be understood by those of ordinary skill in the art that various changes in form and detail may be made therein without departing from the spirit and scope of the present inventive concept as defined by the following claims.

What is claimed is:

1. An apparatus, comprising:
a transceiver; and
at least one processor configured to identify overheating of the transceiver and/or the at least one processor, and wirelessly transmit, to a base station via the transceiver, a message including overheating assistance information based on the identified overheating,
wherein the overheating assistance information includes information about radio resources to be discontinuously processed by the apparatus in a time domain,
the radio resources are allocated in the time domain discontinuously rather than continuously,
at least one component of the transceiver and the at least one processor has an idle state and/or a low-power state in a period when the radio resources are not processed
the at least one processor is further configured to obtain a ratio of slots to be processed by the apparatus per unit time based on a predefined lookup table, and
the information about radio resources to be discontinuously processed included in the overheating assistance information includes the ratio of slots to be processed by the apparatus per unit time based on the predefined lookup table.

2. The apparatus of claim 1, wherein the information about radio resources to be discontinuously processed includes a number of symbols to be processed by the apparatus per unit time.

3. The apparatus of claim 1, wherein the at least one processor is further configured to identify radio resources scheduled by the base station based on the information about radio resources, and discontinuously process the identified radio resources.

4. The apparatus of claim 1, wherein the overheating assistance information further includes information about a radio resource to which a reference signal is to be allocated.

5. The apparatus of claim 4, wherein the information about a radio resource to which a reference signal is to be allocated includes information about a slot and/or a symbol to which a channel state information reference signal (CSI-RS) is to be allocated.

6. The apparatus of claim 4, wherein the information about a radio resource to which a reference signal is to be allocated includes information about a slot and/or a symbol to which a tracking reference signal (TRS) is to be allocated.

7. The apparatus of claim 4, wherein the at least one processor is further configured to identify a reference signal from radio resources scheduled by the base station based on the information about a radio resource to which a reference signal is to be allocated.

8. The apparatus of claim 1, wherein the apparatus is configured to wirelessly communicate with the base station based on a first frequency range and/or a second frequency range, and the information about radio resources to be discontinuously processed includes information about radio resources respectively corresponding to the first frequency range and the second frequency range.

9. The apparatus of claim 1, wherein the at least one processor is further configured to transmit, to the base station via the transceiver, a message including uplink control information (UCI) including a value indicating the overheating based on the identified overheating.

10. An apparatus, comprising:
a transceiver; and
at least one processor configured to wirelessly receive, from a user equipment via the transceiver, a message including overheating assistance information generated based on overheating of the user equipment, and wirelessly transmit radio resources scheduled based on the overheating assistance information to the user equipment via the transceiver,
wherein the overheating assistance information includes information about radio resources to be discontinuously processed by the user equipment in a time domain so that at least one component of the user equipment has an idle state and/or a low-power state in a period when the radio resources are not processed,
the radio resources are allocated in the time domain discontinuously rather than continuously,
the at least one processor is further configured to obtain a ratio of slots to be processed by the apparatus per unit time based on a predefined lookup table, and
the information about radio resources to be discontinuously processed included in the overheating assistance information includes the ratio of slots to be processed by the apparatus per unit time based on the predefined lookup table.

11. The apparatus of claim 10, wherein the information about radio resources to be discontinuously processed includes information about a plurality of slots and/or a plurality of symbols to be processed by the apparatus, and
the at least one processor is further configured to discontinuously allocate at least one of the plurality of slots and/or at least one of the plurality of symbols for the user equipment in the time domain based on the information about the plurality of slots and/or the plurality of symbols.

12. The apparatus of claim 11, wherein the at least one processor is further configured to allocate a slot of the plurality of slots and/or a symbol of the plurality of symbols that is not allocated to the user equipment, to another user equipment.

13. The apparatus of claim 10, wherein the overheating assistance information further includes information about a radio resource to which a reference signal is to be allocated, and
the at least one processor is further configured to identify at least one radio resource based on the information about a radio resource to which a reference signal is to be allocated, and allocate the reference signal for the user equipment to the identified at least one radio resource.

14. The apparatus of claim 10, wherein the at least one processor is further configured to receive, from the user equipment via the transceiver, a message including uplink control information (UCI) including a value indicating overheating of the user equipment, and identify overheating of the user equipment based on the value indicating the overheating.

15. An apparatus, comprising:
a transceiver; and
at least one processor configured to identify overheating of the transceiver and/or the at least one processor, and wirelessly transmit, to a base station via the transceiver, a message including overheating assistance information based on the identified overheating,
wherein the overheating assistance information includes information about transport blocks to be processed by the at least one processor per unit time, and further includes information about radio resources to be discontinuously processed by the apparatus in a time domain,
the radio resources are allocated in the time domain discontinuously rather than continuously,
the information about transport blocks includes information about hybrid automatic repeat request (HARQ) processes to be processed by the at least one processor,
the information about transport blocks further includes information about a maximum physical downlink shared channel (PDSCH) to be decoded by the at least one processor per unit time and/or a maximum physical uplink shared channel (PUSCH) to be encoded by the at least one processor per unit time, and
the at least one processor is further configured to process a PDSCH and/or a PUSCH based on a first processing type or a second processing type, and the information about a maximum PDSCH to be decoded and/or a maximum PUSCH to be encoded includes information corresponding to the first processing type and/or the second processing type.

16. The apparatus of claim 15, wherein the information about HARQ processes includes an ID of at least one HARQ process to be processed by the at least one processor.

17. The apparatus of claim 15, wherein the at least one processor is further configured to decode all physical downlink control channels (PDCCHs) and process at least one HARQ process based on the information about HARQ processes.

* * * * *